(12) United States Patent
Klosin et al.

(10) Patent No.: US 10,471,690 B2
(45) Date of Patent: Nov. 12, 2019

(54) SULFONYLAZIDE DERIVATIVE FOR TIE LAYER

(71) Applicant: Dow Global Technologies LLC, Midland, MI (US)

(72) Inventors: Jerzy Klosin, Midland, MI (US); Ahmad Madkour, Canton, MI (US); Adriana I. Moncada, Midland, MI (US); Brian W. Walther, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 180 days.

(21) Appl. No.: 15/540,367

(22) PCT Filed: Dec. 30, 2015

(86) PCT No.: PCT/US2015/068003
§ 371 (c)(1),
(2) Date: Jun. 28, 2017

(87) PCT Pub. No.: WO2016/109628
PCT Pub. Date: Jul. 7, 2016

(65) Prior Publication Data
US 2018/0001603 A1    Jan. 4, 2018

Related U.S. Application Data

(60) Provisional application No. 62/097,855, filed on Dec. 30, 2014.

(51) Int. Cl.
*B32B 7/12*        (2006.01)
*B32B 27/08*       (2006.01)
(Continued)

(52) U.S. Cl.
CPC ............... *B32B 27/08* (2013.01); *B32B 7/12* (2013.01); *B32B 27/32* (2013.01); *B32B 27/34* (2013.01);
(Continued)

(58) Field of Classification Search
None
See application file for complete search history.

(56) References Cited

U.S. PATENT DOCUMENTS

| | | | |
|---|---|---|---|
| 3,530,108 A | | 9/1970 | Oppenlander |
| 3,585,103 A | * | 6/1971 | Thomson ............... C03C 17/32 156/314 |

(Continued)

FOREIGN PATENT DOCUMENTS

| | | |
|---|---|---|
| EP | 0129368 A1 | 12/1984 |
| EP | 0260999 A1 | 3/1988 |

(Continued)

OTHER PUBLICATIONS

Bateman et al. "Sulfonyl Azides—An Alternative Route to Polyolefin Modifiation" Journal of Applied Polymer Science, vol. 84, 2002, 1395-1402. (Year: 2002).*

(Continued)

*Primary Examiner* — Robert S Loewe
(74) *Attorney, Agent, or Firm* — Husch Blackwell LLP

(57) ABSTRACT

The present disclosure provides a multilayer film. In an embodiment, a multilayer film is provided and includes: a layer (A) comprising an olefin-based polymer; a layer (B) that is a tie layer comprising a sulfonamide derivative grafted olefin-based polymer (SD-g-PO); and a layer (C) comprising a polar component.

10 Claims, 2 Drawing Sheets

(51) Int. Cl.
*B32B 27/32* (2006.01)
*B32B 27/34* (2006.01)
*C08F 8/34* (2006.01)

(52) U.S. Cl.
CPC ............ *C08F 8/34* (2013.01); *B32B 2250/24* (2013.01); *B32B 2250/246* (2013.01); *B32B 2250/40* (2013.01); *B32B 2439/00* (2013.01); *B32B 2439/70* (2013.01); *B32B 2553/00* (2013.01)

(56) References Cited

U.S. PATENT DOCUMENTS

| | | | |
|---|---|---|---|
| 3,616,199 A | 10/1971 | Breslow | |
| 3,645,992 A | 2/1972 | Elston | |
| 3,701,788 A | 10/1972 | Sayigh et al. | |
| 4,031,068 A | 6/1977 | Cantor | |
| 4,076,698 A | 2/1978 | Anderson et al. | |
| 4,174,358 A * | 11/1979 | Epstein | C08L 77/00 525/183 |
| 4,297,283 A * | 10/1981 | Verbicky | C07C 51/363 549/246 |
| 4,410,661 A * | 10/1983 | Epstein | C08L 77/00 138/118 |
| 4,515,636 A | 5/1985 | Carney et al. | |
| 4,654,262 A * | 3/1987 | Alonso | B32B 27/04 428/345 |
| 4,666,631 A | 5/1987 | Udding | |
| 4,701,432 A | 10/1987 | Welborn | |
| 4,861,843 A | 8/1989 | Udding et al. | |
| 4,935,397 A | 6/1990 | Chang | |
| 4,935,466 A | 6/1990 | Udding | |
| 4,937,301 A | 6/1990 | Chang | |
| 5,055,438 A | 10/1991 | Canich | |
| 5,272,236 A | 12/1993 | Lai et al. | |
| 5,278,272 A | 1/1994 | Lai et al. | |
| 5,356,999 A * | 10/1994 | Kapuscinski | C10M 151/02 525/286 |
| 5,512,329 A * | 4/1996 | Guire | A61F 2/0077 427/2.1 |
| 5,814,384 A * | 9/1998 | Akkapeddi | C08L 77/00 138/121 |
| 5,877,257 A * | 3/1999 | Fetell | C08L 23/08 525/166 |
| 6,143,829 A | 11/2000 | Babb et al. | |
| 6,211,302 B1 | 4/2001 | Ho et al. | |
| 6,284,842 B1 * | 9/2001 | Ho | C08G 81/02 525/194 |
| 6,331,597 B1 | 12/2001 | Drumright et al. | |
| 6,359,073 B1 | 3/2002 | Babb et al. | |
| 6,376,623 B1 | 4/2002 | Hoenig et al. | |
| 6,521,306 B1 | 2/2003 | Hoenig et al. | |
| 6,528,136 B1 | 3/2003 | Ho et al. | |
| 6,552,129 B2 | 4/2003 | Babb et al. | |
| 6,670,004 B1 * | 12/2003 | Green | B60T 17/043 138/125 |
| 7,399,808 B2 | 7/2008 | Walters et al. | |
| 9,453,598 B2 * | 9/2016 | Leiden | B32B 1/08 |
| 2002/0146193 A1 | 10/2002 | Tau et al. | |
| 2002/0168489 A1 * | 11/2002 | Ting | B32B 27/08 428/35.4 |
| 2003/0165646 A1 * | 9/2003 | Porter | B32B 27/34 428/35.2 |
| 2005/0059754 A1 * | 3/2005 | Lunt | C08K 9/02 523/210 |
| 2007/0275219 A1 * | 11/2007 | Patel | B32B 27/32 428/219 |
| 2013/0092590 A1 | 3/2013 | Bellini et al. | |
| 2014/0206251 A1 * | 7/2014 | Stokes | B01D 69/12 442/91 |
| 2016/0347876 A1 * | 12/2016 | Beek | C08K 5/15 |

FOREIGN PATENT DOCUMENTS

| | | |
|---|---|---|
| EP | 0834415 A2 | 4/1998 |
| EP | 2397325 A1 | 12/2011 |
| WO | 90/07526 A1 | 7/1990 |
| WO | 99/10415 A1 | 3/1999 |
| WO | 99/10427 A1 | 3/1999 |
| WO | 00/78861 A1 | 12/2000 |

OTHER PUBLICATIONS

Randall, Rev. Macromol. Chem. Phys., C29(2&3), 1989, 201-317.
Zimm, B.H., J. Chem. Phys., vol. 17, No. 12, 1949, 1301-1314.

* cited by examiner

1

SULFONYLAZIDE DERIVATIVE FOR TIE LAYER

BACKGROUND

The present disclosure relates to multilayer structures with a tie layer synthesized or prepared from a sulfonyl azide derivative, and compositions, articles and processes for producing the same.

Tie layers containing maleic anhydride (MAH) grafted onto polyolefin (MAH-g-PO) are used in multilayer films for food packaging and specialty packaging. The MAH-g-PO tie layer is typically used to bind a polyolefin layer to other layers containing a polar substrate, such as nylon, for example. Currently, MAH-g-PO tie layer is produced via free radical grafting of maleic anhydride onto polyolefin in a melt blend process. However, free radical grafting is problematic because undesired crosslinking side reactions occur that affect the rheological properties (such as melt viscosity, for example) of the produced MAH-g-PO. In addition, when the polyolefin is polypropylene, undesired chain scission side reactions (resulting in lower molecular weight and higher melt flow rate) occur during free radical grafting.

Desirable would be a polyolefin with MAH functionalization that is not subject to crosslinking and/or chain scission during the production thereof.

SUMMARY

The present disclosure provides a multilayer film. In an embodiment, a multilayer film is provided and includes:

a layer (A) comprising an olefin-based polymer;

a layer (B) that is a tie layer comprising a sulfonamide derivative grafted olefin-based polymer (SD-g-PO); and a layer (C) comprising a polar component.

The present disclosure provides another multilayer film. In an embodiment, a multilayer film is provided and includes:

a layer (A) comprising an olefin-based polymer;

a layer (B) that is a tie layer comprising a sulfonamide derivative grafted olefin-based polymer (SD-g-PO);

a layer (C) comprising a polar component;

a layer (D) that is a tie layer, the layer (D) comprising the SD-g-PO;

a layer (E) comprising an olefin-based polymer; and the multilayer film has the structure A/B/C/D/E.

The present disclosure provides a process. In an embodiment, a process is provided and includes melt blending a polyolefin and a sulfonyl azide derivative at a temperature greater than or equal to the decomposition temperature of the sulfonyl azide derivative. The process includes the sulfonyl azide derivative to the polyolefin substrate with at least 50% grafting efficiency; and producing a sulfonamide derivative grafted polyolefin.

An advantage of the present disclosure is a tie layer for adhesion between dissimilar materials.

An advantage of the present disclosure is a polymeric tie layer for adhesion between a layer containing a non-polar polymeric component and a layer containing a polar polymeric component.

An advantage of the present disclosure is a multilayer film with a sulfonamide derivative grafted olefin-based polymer tie layer with suitable adhesion properties for food packaging and specialty packaging applications, and the sulfonamide derivative grafted olefin-based polymer tie layer avoids the processing drawbacks of free-radical grafted MAH-g-PO tie layer.

DEFINITIONS

Figure 1:
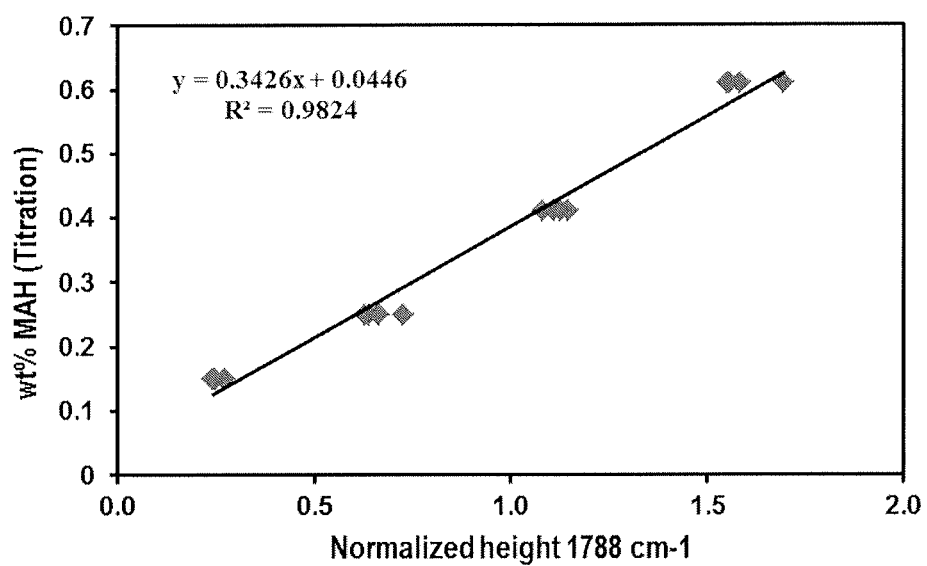
FIG. 1 shows FTIR calibration curve for weight percent (wt %) MAH.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

The term "alkyl," (or "alkyl group") as described herein, refers to an organic radical derived from an aliphatic hydrocarbon by deleting one hydrogen atom therefrom. An alkyl group may be a linear, branched, cyclic or a combination thereof. The term "substituted alkyl," as used herein, refers to an alkyl, in which at least one hydrogen atom is substituted with a substituent that comprises at least one heteroatom. Heteroatoms include, but are not limited to, O, N, P and S. Substituents include, but are not limited to, halide, OR', NR'$_2$, PR'$_2$, P(=O)R'$_2$, SiR'$_3$; where each R' is independently a $C_1$-$C_{20}$ hydrocarbyl group.

The term "aryl," (or "aryl group") as described herein, refers to an organic radical derived from aromatic hydrocarbon by deleting one hydrogen atom therefrom. An aryl group may be a monocyclic and/or fused ring system, each ring of which suitably contains from 5 to 7, preferably from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphthacenyl, fluoranthenyl and the like. The naphthyl may be 1-naphthyl or 2-naphthyl, the anthryl may be 1-anthryl, 2-anthryl or 9-anthryl, and the fluorenyl may be any one of 1-fluorenyl, 2-fluorenyl, 3-fluorenyl, 4-fluorenyl and 9-fluorenyl. The term "substituted aryl," as used herein, refers to an aryl, in which at least one hydrogen atom is substituted with a substituent comprising at least one heteroatom. Heteroatoms include, but are not limited to, O, N, P and S. Substituents include, but are not limited to, halide OR', NR'$_2$, PR'$_2$, P(=O)R'$_2$, SiR'$_3$; where each R' is independently a $C_1$-$C_{20}$ hydrocarbyl group.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term, "ethylene/alpha-olefin polymer," as used herein, refers to an interpolymer that comprises a majority weight percent polymerized ethylene monomer (based on the total amount of polymerizable monomers), and at least one polymerized α-olefin.

The term, "ethylene-based polymer," as used herein, refers to a polymer that comprises a majority weight percent polymerized ethylene monomer (based on the total weight of polymerizable monomers), and optionally may comprise at least one polymerized comonomer.

The term "heteroatom" refers to an atom other than carbon or hydrogen. Nonlimiting examples of suitable heteroatoms include: F, Cl, Br, N, O, P, B, S, Si, Sb, Al, Sn, As, Se and Ge.

The terms, "hydrocarbyl" and "hydrocarbon" refer to substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" and "substituted hydrocarbon" refer to a hydrocarbyl group that is substituted with one or more nonhydrocarbyl substituent groups. The terms, "heteroatom containing hydrocarbyl," "heterohydrocarbyl" and like terms refer to groups in which at least one atom other than hydrogen or carbon is present along with one or more carbon atom and one or more hydrogen atoms.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term "olefin-based polymer" (or "polyolefin" or "PO") is a polymer containing, in polymerized form, a majority weight percent of an olefin, for example ethylene or propylene, based on the total weight of the polymer. Nonlimiting examples of olefin-based polymers include ethylene-based polymers and propylene-based polymers. The term "olefin-based polymer" and "polyolefin" are used interchangeably.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers), terpolymers (which usually refers to polymers prepared from three different types of monomers or comonomers), tetrapolymers (which usually refers to polymers prepared from four different types of monomers or comonomers), and the like.

The term, "propylene/alpha-olefin polymer," as used herein, refers to an interpolymer that comprises a majority weight percent polymerized propylene monomer (based on the total amount of polymerizable monomers), and at least one polymerized α-olefin.

The term, "propylene-based polymer," as used herein, refers to a polymer that comprises a majority weight percent polymerized propylene monomer (based on the total amount of polymerizable monomers), and optionally may comprise at least one polymerized comonomer.

The term, "propylene/ethylene copolymer," as used herein, refers to an interpolymer that comprises a majority weight percent polymerized propylene monomer (based on the total amount of polymerizable monomers), polymerized ethylene monomer (second predominant monomer), and, optionally, at least polymerized one α-olefin.

DETAILED DESCRIPTION

The present disclosure provides a multilayer structure. In an embodiment, the multilayer structure is a multilayer film and includes:

a layer (A) comprising an olefin-based polymer;

a layer (B) that is a tie layer comprising a sulfonamide derivative grafted olefin-based polymer (SD-g-PO), and a layer (C) comprising a polar component.

In an embodiment, the multilayer film can have a thickness from 0.00762 millimeters (mm) (0.3 mils) to 0.508 mm (20 mils).

1. Layer A

The layer (A) includes one or more olefin-based polymer(s). The olefin-based polymer can be an ethylene-based polymer, a propylene-based polymer, and a combination thereof.

In an embodiment, the ethylene-based polymer is an ethylene/alpha-olefin polymer. Ethylene/alpha-olefin polymer may be a random ethylene/alpha-olefin polymer or an ethylene/alpha-olefin multi-block polymer. The alpha-olefin is selected from propylene, butene, methyl-1-pentene, hexene, octene, decene, dodecene, tetradecene, hexadecene, octadecene, cyclohexyl-1-propene (allyl cyclohexane), vinyl cyclohexane, and combinations thereof. The ethylene/alpha-olefin polymer has an alpha-olefin content of from 1 mole percent (mole %), or 4 mole %, or 5 mole %, or 10 mole % to 15 mole %, or 20 mole %, or 30 mole %. Mole % is based on the comonomers in the polymer.

In an embodiment, the ethylene-based polymer is homogeneous branched substantially linear ethylene/α-olefin copolymer. Suitable α-olefins are discussed above.

In an embodiment, the ethylene/alpha-olefin copolymer is a homogeneous branched linear ethylene/α-olefin polymer, and further a copolymer.

The terms "homogeneous" and "homogeneously-branched" are used in reference to an ethylene/α-olefin polymer, in which the α-olefin comonomer is randomly distributed within a given polymer molecule, and all of the polymer molecules have the same or substantially the same comonomer-to-ethylene ratio.

The homogeneously branched linear ethylene copolymers are ethylene-based polymers, which lack long chain branching, but do have short chain branches, derived from the comonomer polymerized into the interpolymer, and which are homogeneously distributed, both within the same polymer chain, and between different polymer chains. These ethylene/α-olefin copolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, for example, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack (no measurable) long chain branching, just as is the case for the linear low density polyethylene polymers or linear high density polyethylene polymers. Commercial examples of homogeneously branched linear ethylene/α-olefin interpolymers include TAFMER® polymers from the Mitsui Chemical Company, and EXACT® and EXCEED® polymers from ExxonMobil Chemical Company.

The substantially linear ethylene/α-olefin polymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone. See, for example, U.S. Pat. Nos. 5,272,236; 5,278,272; each incorporated herein by reference.

The substantially linear ethylene/α-olefin polymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

Long chain branching can be determined by using $^{13}C$ Nuclear Magnetic Resonance (NMR) spectroscopy, and can be quantified using the method of Randall (Rev. Macromol. Chem. Phys., C29 (2 & 3), 1989, p. 285-297), the disclosure of which is incorporated herein by reference. Two other methods are Gel Permeation Chromatography, coupled with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

In an embodiment, the ethylene/alpha-olefin polymer is selected from ethylene/propylene copolymer, ethylene/butene copolymer, ethylene/1-hexene copolymers, ethylene/1-octene copolymer, linear low density polyethylene, low density polyethylene, and combinations thereof.

In an embodiment, the ethylene/alpha-olefin copolymer is a homogeneously branched linear ethylene/α-olefin copolymer, or a homogeneous branched substantially linear interpolymer copolymer. Suitable α-olefins are discussed above.

In an embodiment, the ethylene/alpha-olefin copolymer has one, some, or all of the following properties:
a density from 0.87 g/cc, or 0.89 g/cc, or 0.90 g/cc, or 0.91 g/cc to 0.93 g/cc, or 0.94 g/cc, or 0.95 g/cc or 0.96 g/cc;
a melting point, Tm, from 80° C., 90° C., or 100° C. to 134° C., or 153° C., or 164° C.;
a melt flow (MF) (I2) from 0.3 g/10 min, or 1.0 g/10 min, or 2.0 g/10 min, or 6.0 g/10 min to 10 g/10 min, or 25 g/10 min, or 50 g/10 min.

In an embodiment, the ethylene/alpha-olefin copolymer is an ethylene-octene copolymer.

In an embodiment, the ethylene/alpha-olefin copolymer is a linear low density polyethylene. Linear low density polyethylene ("LLDPE") comprises, in polymerized form, a majority weight percent of ethylene based on the total weight of the LLDPE. In an embodiment, the LLDPE is an interpolymer of ethylene and at least one ethylenically unsaturated comonomer. In one embodiment, the comonomer is a $C_3$-$C_{20}$ α-olefin. In another embodiment, the comonomer is a $C_3$-$C_8$ α-olefin. In another embodiment, the $C_3$-$C_8$ α-olefin is selected from propylene, 1-butene, 1-hexene, or 1-octene. In an embodiment, the LLDPE is selected from the following copolymers: ethylene/propylene copolymer, ethylene/butene copolymer, ethylene/hexene copolymer, and ethylene/octene copolymer.

In an embodiment, the LLDPE is an ethylene/hexene copolymer.

In an embodiment, the LLDPE is an ethylene/octene copolymer.

The LLDPE has a density in the range from 0.89 g/cc, or 0.91 g/cc to 0.92 g/cc, or 0.94 g/cc. The LLDPE has a melt flow (MF) (I2) from 0.1 g/10 to 5 g/10 min, or 10 g/10 min.

LLDPE can be produced with Ziegler-Natta catalysts, or single-site catalysts, such as vanadium catalysts and metallocene catalysts. In an embodiment, the LLDPE is produced with a Ziegler-Natta type catalyst. LLDPE is linear and does not contain long chain branching and is different than low density polyethylene ("LDPE") which is branched or heterogeneously branched polyethylene. LDPE has a relatively large number of long chain branches extending from the main polymer backbone. LDPE can be prepared at high pressure using free radical initiators, and typically has a density from 0.915 g/cc to 0.940 g/cc.

In an embodiment, the LLDPE is a Ziegler-Natta catalyzed ethylene and octene copolymer and has a density from 0.91 g/cc to 0.93 g/cc, or 0.92 g/cc. The LLDPE has crystallinity from about 40% to about 50%, or about 47%. Nonlimiting examples of suitable Ziegler-Natta catalyzed LLDPE are polymers sold under the tradename DOWLEX, available from The Dow Chemical Company, Midland, Mich. In a further embodiment, the LLDPE is DOWLEX 2045 or DOWLEX 2045G.

The ethylene-based polymer may comprise two or more embodiments disclosed herein.

In an embodiment, the olefin-based polymer is a propylene-based polymer. Suitable propylene-based polymers include propylene homopolymers and propylene interpolymers. The polypropylene homopolymer can be isotactic, syndiotactic or atactic polypropylene. The propylene interpolymer can be a random or block copolymer, or a propylene-based terpolymer. Reactor copolymers of polypropylene may also be used. A nonlimiting example of a suitable propylene-based polymer is PRO-FAX™ 6361, available from LyondellBasell Industries Suitable comonomers for polymerizing with propylene include ethylene, butene, pentene, hexene, heptene, octene, nonene, decene, undecene, dodecene, as well as 4-methyl-1-pentene, 4-methyl-I-hexene, 5-methyl-1-hexene, vinylcyclohexane, and styrene. In an embodiment, the comonomers include ethylene, 1-butene, 1-hexene, and 1-octene.

Layer A can be a blend of two or more polyolefins as disclosed herein.

2. Layer (B)

The present multilayer structure includes a layer (B) that is a tie layer. The tie layer is located between the layer (A) and the layer (C) thereby bonding, or otherwise attaching, the layer (A) to the layer (C).

In an embodiment, the layer (B) directly contacts the layer (A). The term "directly contacts," as used herein, is a layer configuration whereby a first layer is located immediately adjacent to a second layer and no intervening layers, or no intervening structures, are present between the first layer and the second layer.

The tie layer, layer (B), includes a sulfonamide derivative (SD) grafted to an olefin-based polymer (SD-g-PO). The base olefin-based polymer of the SD-g-PO can be any olefin-based polymer as disclosed for the layer (A).

The grafting agent used to prepare tie layer, layer (B), is a sulfonyl azide derivative with the Structure (1) below.

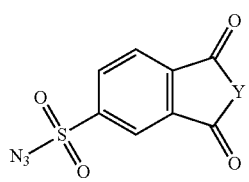

Structure (1)

For Structure (1), Y is selected from O, S, PH, PR, NH, and NR. When Y is NR or PR, R is selected from an alkyl group and an aryl group.

The SD-g-PO is formed by admixing the sulfonyl azide derivative with the olefin-based polymer and heating the admixture to at least the decomposition temperature of the sulfonyl azide derivative. The decomposition temperature is the temperature at which the sulfonyl azide derivative converts to the sulfonyl nitrene, eliminating nitrogen and heat in the process. In an embodiment, the olefin-based polymer and the sulfonyl azide derivative are dry blended to form a uniform mixture and this mixture is subsequently added to melt processing equipment, e.g., a melt extruder to achieve the grafting reaction, at a temperature that is at least the decomposition temperature of the sulfonyl azide derivative. The term "melt processing" (or "melt processing conditions") is a process in which the olefin-based polymer is softened or melted. Nonlimiting examples of suitable melt processing procedures include extrusion (including co-extrusion), pelletizing, film blowing, film casting, thermoforming, and compounding in polymer melt form.

Bounded by no particular theory, it is believed that under melt processing conditions, the sulfonyl azide derivative decomposes to form an intermediate singlet sulfonyl nitrene and nitrogen gas. The reactive singlet sulfonyl nitrene undergoes carbon-hydrogen bond insertion to form secondary sulfonamide linkages to the backbone of the olefin-based polymer, thereby producing a SD-g-PO with the Structure (2) below.

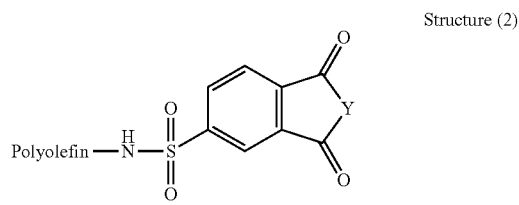

Structure (2)

Y of Structure (2) is selected from O, S, PH, PR, NH, and NR. When Y is NR or PR, R is selected from an alkyl group and an aryl group. The nitrogen, N, in Structure (2) is bound to a carbon, C, of the polyolefin.

In an embodiment, the sulfonyl azide derivative is 4-azidosulfonylphthalic anhydride (ASPA). The ASPA has the Structure (3) provided below.

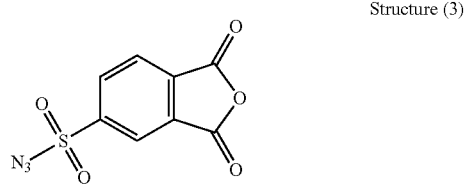 [SMILES: [N-]=[N+]=NS(=O)(=O)c1ccc2c(c1)C(=O)OC2=O]

Structure (3)

Under melt processing conditions, the ASPA decomposes to form an intermediate singlet sulfonyl nitrene and nitrogen gas. The reactive singlet sulfonyl nitrene undergoes carbon-hydrogen bond insertion to form secondary sulfonamide linkages to the backbone of the olefin-based polymer, thereby producing a sulfonamide phthalic anhydride-grafted-polyolefin or "SPA-g-PO" with the Structure (4) below. The nitrogen, N, in Structure (4) is bound to a carbon, C, of the polyolefin.

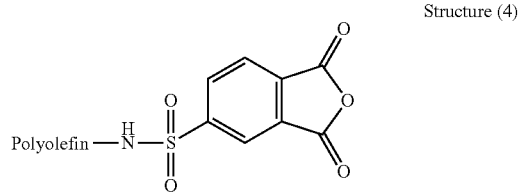

Structure (4)

When the ASPA is grafted to the olefin-based polymer, a sulfonamide phthalic anhydride grafted olefin-based polymer (SPA-g-PO) is formed. Applicant discovered the ASPA grafting reaction occurs with little, or no, crosslinking, and little molecular weight degradation by chain scission when propylene-based polymer is the base olefin-based polymer.

In an embodiment, the olefin-based polymer is an ethylene/alpha-olefin copolymer and the sulfonyl azide derivative is the ASPA. The ethylene/alpha-olefin copolymer and the ASPA are admixed under melt processing conditions to produce a sulfonamide phthalic anhydride grafted ethylene-based polymer (SPA-g-PE) with a grafting efficiency (GE) from at least 50%, or 60%, or 70%, or 80% to 90%, or 95%, or 99%. In a further embodiment, the SPA-g-PE contains maleic anhydride in an amount from 0.1 wt %, or 0.2 wt %, or 0.3 wt %, or 0.4 wt %, or 0.5 wt %, or 0.6 wt % to 0.7 wt %, or 0.8 wt %, or 0.9 wt %, or 1.0 wt %, or 1.1 wt %, or 1.5 wt %, or 2.0 wt %, or 10 wt %. Weight percent maleic anhydride is based on the total weight of the SPA-g-PE.

3. Layer (C)

The present multilayer structure includes a layer (C). The layer (C) includes a polar component. The layer (B) is a tie layer and is located between the layer (A) and the layer (C) thereby bonding, or otherwise attaching the layer (A) to the layer (C).

In an embodiment, the layer (B) tie layer directly contacts the layer (C). In a further embodiment, the layer (B) directly contacts the layer (A) (on a first side of layer (B)) and the layer (B) directly contacts the layer (C) (on a second side that is opposite the first side of the layer (B)), providing the multilayer film with the following layer configuration: A/B/C.

The layer (C) includes a polar component. Nonlimiting examples of suitable polar components include metal foil, nylon, ethylene/vinyl alcohol (EVOH) copolymers, polybutylene terephthalate (PBT), polyethylene terephthalate (PET), ethylene/acrylic acid (EAA) copolymers, ethylene/methacrylic acid (EMAA) copolymers, polylactic acid, cellulosic material (such as paper), and combinations thereof.

In an embodiment, the polar component is a polar polymer. A "polar polymer" is a polymer molecule with a permanent dipole, i.e., the polymer molecule has a positive end and a negative end. In other words, the electrons in a polar molecule are not shared equally among the atoms of the molecule. In contrast, a "nonpolar polymer" is a polymer molecule that does not have a permanent dipole, i.e., the polymer does not have a positive end and a negative end. The electrons in a nonpolar molecule are essentially equally shared among the atoms of the molecule. Most hydrocarbon liquids and polymers are nonpolar. Nonlimiting examples of suitable polar polymers include polymers containing a reactive proton such as in a hydroxyl (—OH) or amino (—NH) functionality.

Under melt processing conditions, the SD-g-PO in layer (B) forms at least one linkage with the polar component in the layer (C). The linkage has the Structure (5).

Structure (5)

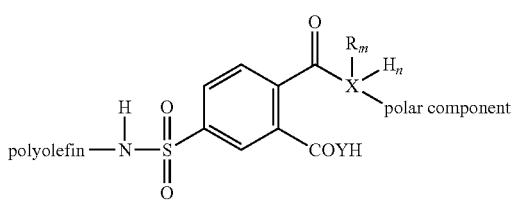

wherein the nitrogen, N, is bound to a carbon, C, of the polyolefin;

X is selected from O, P, S, and N;
Y is selected from O, S, PH, PR, NH, and NR;
R is a $C_1$-$C_8$ alkyl group;
m and n each independently is 0 or 1 with the proviso when m=1, n=0
and when n=1, m=0. In other words Structure (5) contains $R_m$ or $H_n$.

In an embodiment, X of Structure (5) is derived from the polar component.

In an embodiment, Y of Structure (5) is oxygen, or O.

In an embodiment, Y of Structure (5) is oxygen, O; X of Structure (5) is nitrogen, N; m=0; and n=1.

In an embodiment, the multilayer film includes:
layer (A) composed of an ethylene/alpha-olefin copolymer;
layer (B) composed of SPA-g-PE; and
layer (C) composed of a nylon. Layer (B) is in direct contact with layer (A) and layer (C). The multilayer film has a peel strength from 538 N/m to 813 N/m as measured in accordance with the T-Peel test.

In an embodiment, layer (A), layer (B), and layer (C) are coextruded to form a multilayer film with structure A/B/C. The SPA-g-PE in the tie layer (B) bonds with the layer (C) by way of the nitrogen in the nylon polymer chain (shown as N-PA6) to form an imide linkage Structure (6b) in Scheme 1 below.

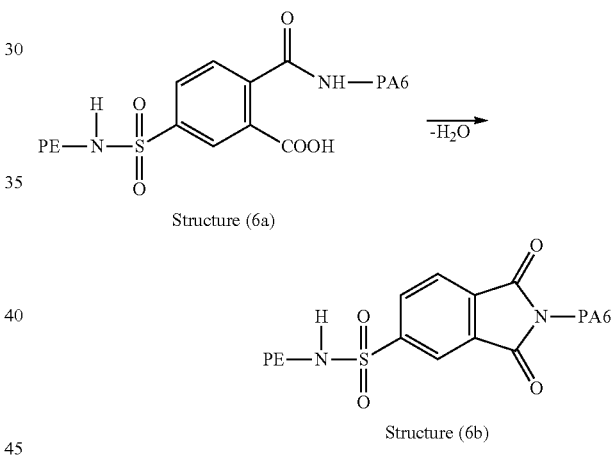

Structure (6a)

Structure (6b)

The present multilayer film can have three layers, or more than three layers. For example, the multilayer film can have four, five, six, seven, eight, nine, ten, eleven, or more layers.

In an embodiment, the multilayer film includes:
layer (A) comprising an olefin-based polymer;
layer (B) that is a tie layer comprising the SD-g-PO;
layer (C) comprising a polar component;
a layer (D) that is a tie layer, the layer (D) comprising the SD-g-PO; and
a layer (E) comprising an olefin-based polymer. The multilayer film has the structure A/B/C/D/E.

The polyolefin in layer (E) can be the same or different than the polyolefin in layer (A). In an embodiment, the polyolefin in layer (E) is the same as the polyolefin in layer (A). In another embodiment, the polyolefin in layer (E) is different than the polyolefin in layer (A).

In an embodiment, the five layer multilayer film has a thickness from 0.00762 millimeters (mm) (0.3 mils) to 0.508 mm (20 mils).

In an embodiment at least one of tie layer (B) and tie layer (D) directly contacts the layer (C).

In an embodiment, the layer (B) and the layer (D) each directly contact the layer (C). The SD-g-PO in layer (B) and the SD-g-PO in layer (D) each form at least one linkage with the polar component of the layer (C). The linkages have the Structure (5) below.

Structure (5)

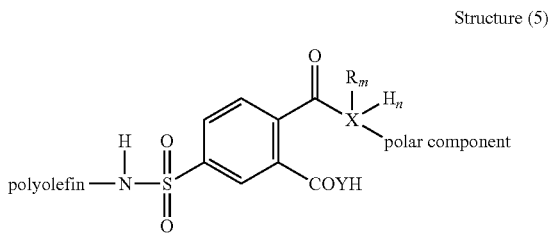

wherein the nitrogen, N, is bound to a carbon, C, of the polyolefin;
X is selected from O, P, S, and N;
Y is selected from O, S, PH, PR, NH and NR;
R is a $C_1$-$C_8$ alkyl group;
m and n each independently is 0 or 1 with the proviso when m=1, n=0
and when n=1, m=0. In other words, Structure (5) contains $R_m$ or $H_n$.

In an embodiment, Y of Structure (5) is oxygen, O; X of Structure (5) is nitrogen, N; m=0; and n=1.

In an embodiment, the multilayer film includes:
layer (A) composed of an ethylene/alpha-olefin copolymer;
layer (B) composed of sulfonamide phthalic anhydride (SPA) grafted ethylene-based polymer (SPA-g-PE);
layer (C) composed of a nylon;
layer (D) composed of sulfonamide phthalic anhydride (SPA) grafted ethylene-based polymer (SPA-g-PE); and
layer (E) composed of an ethylene/alpha-olefin copolymer.

In an embodiment, the layer (B) and the layer (D) each directly contact the nylon in layer (C). The SPA-g-PE in layer (B) and the SPA-g-PE in layer (D) forms imide linkages with the nylon in layer (C). The imide linkage has the Structure (6b) below.

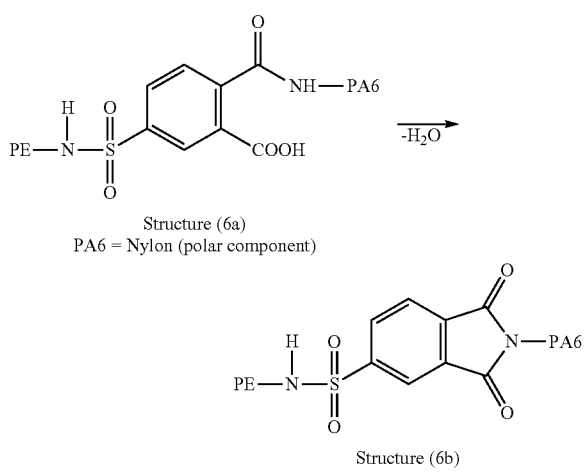

Structure (6a)
PA6 = Nylon (polar component)

Structure (6b)

In an embodiment, layers (A) and (E) are each composed of an LLDPE that is an ethylene/1-octene copolymer, the layers (B) and (D) are each composed of sulfonamide phthalic anhydride (SPA) grafted ethylene/1-octene copolymer, and the layer (B) and the layer (D) each directly contact the nylon in layer (C). In an embodiment, the multilayer film has a peel strength from 627 N/m to 1068 N/m as measured in accordance with the T-Peel test.

In an embodiment, Y of Structure (5) is oxygen, O; X of Structure (5) is oxygen, O; m=0; and n=0.

In an embodiment, the multilayer film includes:
layer (A) composed of an ethylene/alpha-olefin copolymer;
layer (B) composed of sulfonamide phthalic anhydride (SPA) grafted ethylene-based polymer (SPA-g-PE);
layer (C) composed of an EVOH copolymer;
layer (D) composed of sulfonamide phthalic anhydride (SPA) grafted ethylene-based polymer (SPA-g-PE); and
layer (E) composed of an ethylene/alpha-olefin copolymer.

In an embodiment, the layer (B) and the layer (D) each directly contact the EVOH copolymer in layer (C). The SPA-g-PE in layer (B) and the SPA-g-PE in layer (D) forms linkages with the EVOH copolymer in layer (C).

In an embodiment, layers (A) and (E) are each composed of an LLDPE that is an ethylene/1-octene copolymer, the layers (B) and (D) are each composed of sulfonamide phthalic anhydride (SPA) grafted ethylene/1-octene copolymer, and the layer (B) and the layer (D) each directly contact the EVOH copolymer in layer (C). In an embodiment, the multilayer film has a peel strength of 677 N/m as measured in accordance with the T-Peel test.

In an embodiment, the five-layer film with A/B/C/D/E layer configuration is formed as a blown multilayer film with neighboring layers in direct contact with each other. The blown multilayer film has a thickness from 0.3 mils to 20 mils and has an adhesion force from 500 Newton per meter (N/m), or 600 N/m, or 700 N/m to 800 N/m, or 900 N/m, or 1000 N/m, or 1100 N/m.

4. Process

The present disclosure provides a process. In an embodiment, the process includes
melt blending a polyolefin and a sulfonyl azide derivative at a temperature greater than or equal to the decomposition temperature of the sulfonyl azide derivative;
grafting the sulfonyl azide derivative to the polyolefin substrate with at least 50% grafting efficiency; and
producing a sulfonamide derivative grafted polyolefin (SD-g-PO).

In an embodiment, the polyolefin is an LLDPE that is an ethylene/1-octene copolymer (PE) having a first melt flow (MF1) and the SD-g-PE has from 0.15 wt %, or 0.25 wt % to 0.41 wt %, or 0.61 wt % MAH, the SD-g-PE having a second melt flow (MF2), wherein MF1-MF2 is from 0.06 g/10 min, or 0.13 g/10 min to 0.28 g/10 min, or 0.50 g/10 min as measured in accordance with ASTM D 1238 (190° C./2.16 kg). In another embodiment, the SD-g-PE has 0.23 wt % MAH and MF1-MF2 is 0.26 g/10 min. In another embodiment, the SD-g-PE has 0.17 wt % MAH and MF1-MF2 is 0.12 g/10 min.

In an embodiment, the sulfonyl azide derivative has the Structure (1) below and the melt blending converts the sulfonyl azide to a sulfonyl nitrene and eliminates nitrogen gas. The process further includes:
inserting the sulfonyl nitrene into a carbon hydrogen bond of the polyolefin; and
forming a sulfonamide derivative grafted polyolefin having the Structure (2) according to the reaction Scheme 1 below:

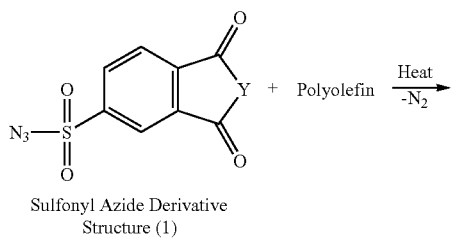

Sulfonyl Azide Derivative Structure (1)

-continued

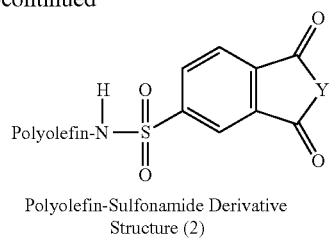

Polyolefin-Sulfonamide Derivative Structure (2)

wherein Y is selected from the group consisting of O, S, $PR_1$ and $NR_2$; and the nitrogen, N, in Structure (2) is bound to a carbon, C, of the polyolefin. In an embodiment, Y is oxygen, O.

In an embodiment, the melt blend further comprises an antioxidant. A nonlimiting example of a suitable antioxidant is Irganox 1010, available from Ciba Specialty Chemicals. In an embodiment, the melt blend contains from greater than 0 wt %, or 0.01 wt % to 0.04 wt %, or 0.05 wt % antioxidant. In an embodiment, the melt blend contains 0.05 wt % antioxidant.

By way of example, and not limitation, examples of the present disclosure are provided.

EXAMPLES

1. Materials

The materials used in the examples are provided in Table 1 below.

TABLE 1

| Material/Description | Properties | Source |
| --- | --- | --- |
| Dowlex 2045G-LLDPE | Melt flow, 190° C./2.16 Kg = 1.0 g/10 min, Density = 0.92 g/cc, melting point = 122° C., Vicat softening point = 108° C. | Dow |
| PRO-FAX ™ 6361 | Melt flow, 190° C./2.16 Kg = 12 g/10 min, Density = 0.9 g/cc. | LyondellBasell Industries |
| Maleic anhydride | Melting point = 52-54° C., Boiling point = 200° C., Relative density = 1.48 g/cc, vapor pressure = 0.33 hPa at 20° C. | Aldrich |
| 4-azidosulfonylphthalic anhydride | Decomposition temperature = 189° C. (DSC). Limiting impact energy as determined by the BAM Fall Hammer Test = 30-40 Joules. Predicted half-life (neat) at 210° C. (DSC, isoconversional analysis) = 36.3 sec. Predicted half-life (in ENGAGE ™ 8400 blend at a 1.96 wt % concentration of 4-azidosulfonylphthalic anhydride) at 210° C. (DSC, isoconversional analysis) = 41.5 sec. | Dow |
| Luperox 101 (2,5 dimethyl 2,5-di-t-butylperoxy Hexane), 90% | Boiling point = 55-57° C. at 9 hPa, Density = 0.877 g/cc at 25° C., Flash point = 65° C. - closed up. | Aldrich |
| AMPLIFY ™ TY 1451 | Density = 0.91 g/cc, Melt flow (190° C./2.16 Kg) = 1.7 g/10 min, MAH graft level = low. | Dow |
| AMPLIFY ™ TY 1353 | Density = 0.92 g/cc, Melt flow (190° C./2.16 Kg) = 2.1 g/10 min, MAH graft level = low. | Dow |
| Nylon (Ultramid C33 01) Polyamide PA 6/66 | Melting point = 196° C., Density = 1.12 g/cc. | BASF |
| Irganox 1010 (Pentaerythritol Tetrakis(3-(3,5-di-tert-butyl-4-hydroxyphenyl)propionate)) | Melting point range = 110-125° C., Specific gravity = 1.15 g/cc (20° C.), Flash point = 297° C. | Ciba |
| EVAL ™ H171B (EVOH copolymer) | Density = 1.17 g/cc, Melting temperature = 172° C., Glass transition temperature = 53° C., Melt flow rate (190° C./2.16 Kg) = 1.7 g/10 min. | Kuraray |
| DJM-1810H (ethylene-1-hexene copolymer) | Density = 0.918 g/cc, Melt flow (190° C./2.16 Kg) = 1.0 g/10 min, Melting temperature = 124° C. | Dow (internal feed stock) |

2. Test Methods

Differential Scanning calorimetry (DSC) is used to measure crystallinity in the polymer (e.g., ethylene-based (PE) polymers, or propylene-based (PP) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Density is determined in accordance with American Society for Testing and Materials (ASTM) procedure ASTM D792-00, Method B.

Melt flow (MF) (I2) in g/10 min for propylene-based polymers and ethylene-based polymers is measured using ASTM D-1238-04 condition 190° C./2.16 kg. Melt flow (MF) (I10) in g/10 min for propylene-based polymers and ethylene-based polymers is measured using ASTM D-1238-04, Condition 190° C./10.0 kg.

The predicted half-life of the 4-azidosulfonylphthalic anhydride is measured using DSC by scanning the 4-azidosulfonylphthalic anhydride at various heating rates. The DSC data collected is utilized to compute the kinetic parameters using AKTS-Thermokinetics Software (available from Advanced Kinetics and Technology Solutions AG). Applying the computed kinetic parameters, the reaction progress for a specific temperature profile is predicted. Subsequently, the predicted half-life of the 4-azidosulfonylphthalic anhydride monomer is obtained from the reaction progress vs. time plot at a given temperature. The same procedure is utilized for a blend of 4-azidosulfonylphthalic anhydride in ENGAGE™ 8400 (an ethylene/octene copolymer available from The Dow Chemical Company) at a concentration of 1.96 wt % of 4-azidosulfonylphthalic anhydride. The predicted half-life is measured in seconds (sec.).

Limiting impact energy is determined using the German Federal Institute for Testing Materials (BAM) Fall Hammer Test. Impact energy is imparted to a 40 mm$^3$ sample of 4-azidosulfonylphthalic anhydride by a falling weight using the BAM Fall Hammer apparatus. The limiting impact energy is determined as the lowest energy at which a flash, flame or explosion is observed. The test assesses the sensitivity of the 4-azidosulfonylphthalic anhydride to drop-weight impact. The method yields quantitative results in the form of limiting impact energy. The testing is carried out at Chilworth Technology Inc., now part of DEKRA Insight. The limiting impact energy is measured in Joules (J).

A. Small Scale Sample Preparation for Mini-Adhesion Testing:

Mini-adhesion test samples are prepared by compression molding to obtain adhesion data on the synthesized SPA-g-PE polymers using a polyamide film as substrate (ULTRAMID C33-01L). A special polyamide test film was prepared consisting of a five layer structure DOWLEX 2045G/AMPLIFY TY 1353/Polyamide/DOWLEX 2045G/DOWLEX 2045G with 30/10/20/10/30 wt % for each layer respectively.

The test sample preparation procedure is described below to determine the adhesion force between the modified polyolefin and a nylon film. This test is a simplified method for determining the adhesion in a commercial processing procedure:

1a) A tie layer film (Example) is prepared by compression molding ~7 to 10 g of the synthesized SPA-g-PE between 125 micron Mylar sheet liners using the following program on a Pasadena Hydraulics Inc. (PHI) 4 platen press, Model: 30U1212S4JCS-N-MS, with all zones set to 340° F. (~170° C.):

- 5 min. at 1,000 lbs (453.592 kg) force on the "low" pressure setting ("melt").
- 7 min. at 30,000 lbs (13601.771 kg) force on the "high" pressure setting ("cure").
- 10 min. at 30,000 lbs (13601.771 kg) force on the "high" pressure setting with the water cooling active.

1b) Tie layer film (control) preparation using MAH-g-PE-control sample synthesized via free radical grafting, is performed by compression molding 7 g to 10 g of material between Teflon coated aluminum foil and following the same program as described above on Pasadena Hydraulics Inc. (PHI) 4 platen press.

2) Two approximately 200 mm by 200 mm squares of the polyamide test films are cut. The polyethylene cover sheets from the polyamide films are delaminated and the polyamide test films are positioned in such a way that the polyamide portions are against the tie layer film. The DOWLEX 2045G layer can be delaminated from the polyamide surface since there is not a tie layer present.

3) The tie layer film, cut to a 150 mm by 150 mm square, is positioned between the delaminated polyamide test films.

4) A ~25 mm wide, 50 micron Teflon strip is placed as spacer along one edge of the tie layer between the polyamide films.

5) The prepared assembly is placed between two Teflon sheets and compression molded at 3207 (~160° C.), 6,000 lbs (2721.554 kg) force for 3 hours in the PHI press. The assembly prepared using PE-g-MAH control sample is placed between two Teflon coated aluminum foil sheets and compression molded at 320° F. (~160° C.), 6,000 lbs (2721.554 kg) force for 3 hours in the PHI press. Similarly, the assembly prepared using un-processed DOWLEX 2045G control sample is placed between two Teflon coated aluminum foil sheets and compression molded at 320° F. (~160° C.), 6,000 lbs (2721.554 kg) force for 3 hours in the PHI press.

6) After three hours the cooling is activated while maintaining 6,000 lbs (2721.554 kg) force. Sample assemblies are removed from the press once platen temperature is 80° C., and allowed to cool to room temperature.

B. T-Peel Test Performed on Small Scale Compression Molded Samples of the Type: Polyamide/SPA-g-PE/Polyamide For T-peel test, the small scale compression molded samples described above are prepared by separating the layers once the spacer Teflon strip is removed so one side has tie layer-polyamide and the other is only polyamide. Subsequently, the films are cut into 25 mm wide strips and about 150 mm long using a JDC "Precision Sample Cutter," model JDC 1-10. Cuts are made with the separated edges at the "top" of the strips. Adhesion data is collected using a TA. XT. Plus Texture Analyzer, Textures Technology Corp., Stable Micro Systems, with Exponent Stable Micro Systems Vers. 4,0,13,0, Formula One & First Impression (Visual Components, Inc.) software. Instrument is calibrated for probe height and force prior to running tests.

The T-peel test procedure is described below:

1) Peel tabs are initiated in a region where the spacer Teflon strip ended. Separation "interface" is adjusted to get a straight line across the strip at 90° to the strip's edges.

2) The polyamide-tie layer side is placed in the lower "stationary" clamp of the TA XT. Plus Texture Analyzer. Polyamide only layer is secured in the upper "traveling" clamp.

3) The sample is peeled at 250 mm per minute jaw speed, total displacement set to 125 mm to allow more than one test to be run on a strip if desired. The mean adhesion force per sample strip is recorded as a function of displacement.

4) The resulting Peel Strength value is reported in newtons (N) per meter (m) or N/m and is generally an average of three to five independent readings.

3. Example Synthesis of 4-Azidosulfonylphthalic Anhydride (ASPA)

A. Preparation of 1,3-dioxo-1,3-dihydroisobenzofuran-5-sulfonyl chloride and 1,3-dioxo-1,3-dihydroisobenzofuran-4-sulfonyl chloride

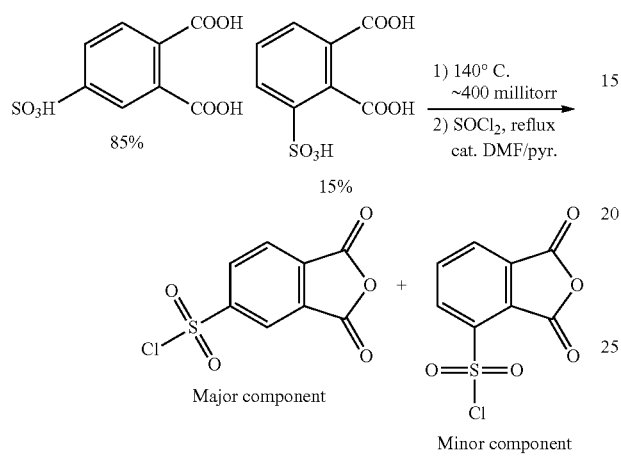

In a 500 mL round-bottom flask, 200 g of sulfophthalic acid aqueous (50 wt %) solution is placed. The solution is evaporated using a rotary evaporator at 95° C. until no more water is evaporated, and is subsequently placed in a Kugelrohr apparatus and heated under high vacuum (~400 millitorr) at ~140° C. until no more water is evaporated to yield 98 g of a viscous yellowish material. After cooling, thionyl chloride (200 mL) is added to the product with catalytic amounts of DMF (dimethyl formamide) (2 drops) and pyridine (2 drops). The flask is fitted with a reflux condenser connected to a nitrogen ($N_2$) line and the reaction mixture is heated to 90° C. (oil bath temperature) overnight. It takes about 1 hour to get a homogeneous solution. The reaction mixture is cooled down and excess thionyl chloride is removed under vacuum using a rotary evaporator. Dichloroethane is added and removed under vacuum (to help remove residual thionyl chloride) to give 95.42 g of pale yellow viscous material. The product is distilled using a Kugelrohr apparatus. Two fractions are isolated. The first fraction (67 g) contains 85% of the 4-isomer and 15% of the 3-isomer. The second fraction (17 g) contains 73% of the 4-isomer and 27% of the 3-isomer. The first fraction is crystallized twice from dichloromethane-hexanes solvent mixture to give 48.5 g of product as a mixture of the 4-isomer and the 3-isomer in 85%:15% ratio, respectively.

$^1$H NMR (major product) (400 MHz, $CD_2Cl_2$): δ 8.68 (dd, J=1.7, 0.9 Hz, 1H), 8.58 (dd, J=8.1, 1.7 Hz, 1H), 8.32 (dd, J=8.1, 0.7 Hz, 1H).

$^1$H NMR (minor product) (400 MHz, $CD_2Cl_2$): δ 8.53 (dd, J=7.9, 0.9 Hz, 1H), 8.41 (dd, J=7.7, 0.9 Hz, 1H), 8.23-8.15 (m, 1H).

$^{13}$C NMR (major product) (101 MHz, $CDCl_3$): δ 160.44, 160.11, 150.64, 135.97, 134.37, 132.62, 127.56, 124.52.

B. Synthesis of 4-Azidosulfonylphthalic Anhydride (ASPA)

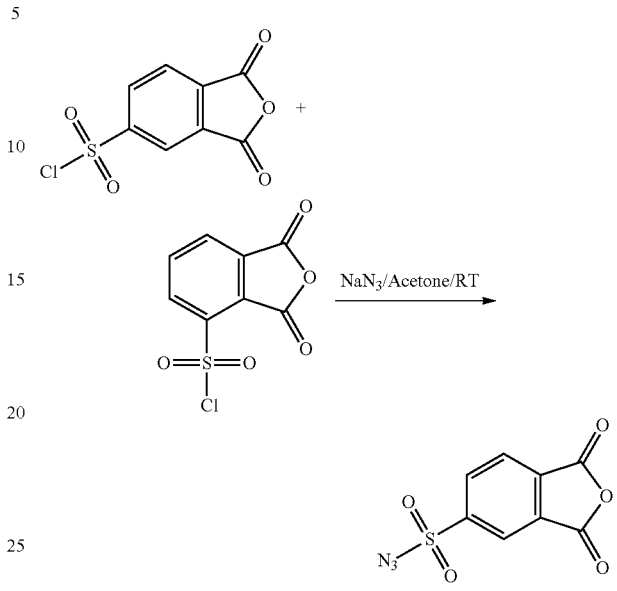

A mixture of 1,3-dioxo-1,3-dihydroisobenzofuran-5-sulfonyl chloride and 1,3-dioxo-1,3-dihydroisobenzofuran-4-sulfonyl chloride (35 g, 0.142 mol) is dissolved in acetone (500 mL). Solid $NaN_3$ (10.92 g, 0.168 mol) is added and the reaction mixture is stirred overnight under nitrogen. The reaction mixture is filtered from the sodium chloride byproduct using filter paper (some of the precipitate goes through the filter paper). The solvent is removed under vacuum and ethyl acetate (300 mL) is added. The sulfonyl azide product dissolves, whereas NaCl and any unreacted $NaN_3$ remains insoluble. The ethyl acetate solution is washed with water, and is subsequently washed with saturated aqueous sodium chloride solution and dried with anhydrous sodium sulfate and filtered. The solvent is removed under vacuum and the product is recrystallized twice from dichloromethane/hexanes to give 9.1 g of final product (yield 25.3%).

$^1$H NMR (500 MHz, acetone-$d_6$): δ 8.68-8.60 (m, 2H), 8.48-8.41 (m, 1H).

$^{13}$C NMR (126 MHz, acetone-$d_6$): δ 162.38, 162.07, 146.10, 137.21, 135.73, 133.89, 128.05, 125.17.

4. Control Sample—Preparation of MAH-g-PE

Polyethylene pellets (DOWLEX 2045G) (44.82 g control, 44.87 g comparative sample (CS-A) are weighed into 125 mL wide mouth polypropylene bottle with matching cap. The grafting reaction is performed using a rebuilt Thermo Scientific Haake Polylab, Model 557-9301, with a Rheomix 600p, Model 557-1302, Hastelloy bowl and matching roller rotors/paddles installed and connected to a Gateway Windows 8 laptop computer. Control of the motor system is from a SEW Eurodrive MDX61B motor controller with MOVI-TOOLS—MotionStudio, vers. 5.70, (5.7.0.2) software. An external box with Watlow Ez-zone units installed is used to set plate/bowl temperatures and high temperature limits. A Graphtec midi logger GL220 with GL220 820APS application software is used for data collection. The temperature at the Haake instrument is set to 180° C. and the system is allowed to equilibrate. The polyethylene pellets are added to the Haake instrument and fluxed at 30 rpm for 2 minutes (min). The desired amount of maleic anhydride (N/A for control, 0.40 wt %, 0.181 g for CS-A) is added to the instrument via a dose bag (0.183 g for control, 0.130 g for CS-A), the rpm is increased to 80 and the mixture is fluxed for 2 min. Subsequently, Luperox 101 (N/A for control, 0.11 wt %, 57 µL CS-A) is added via syringe and the mixture is fluxed for an additional 6 min. The Haake instrument is stopped and the MAH-g-PE polymer is removed from the mixer while hot. Table 2 shows the characterization results from the synthesized control MAH-grafted ethylene-based polymer (MAH-g-PE).

A. MAH-g-PE—Grafting Levels of Maleic Anhydride (MAH) Determination

The grafting levels of MAH are determined via manual colorimetric titration. The MAH-g-PE sample (7 g) is purified via a precipitation of a hot toluene polymer solution (350 mL) into acetone (1 L). The MAH-grafted polymer is collected by filtration, washed with acetone (2×300 mL) and the polymer sample is dried in a vacuum oven at 80° C., overnight. Prior to the titration experiment, the purified polymer is dried in a nitrogen purged vacuum oven at 130° C. for one hour. Subsequently, 1 gram of the dried MAH-grafted polymer is dissolved in hot xylenes. The sample is titrated with 0.025 N tetrabutylammonium hydroxide in 50/50 methanol/toluene using bromothymol blue indicator to a constant blue color endpoint. The MAH-g-PE sample is titrated three times and the results are averaged.

Preliminary peel strength data is obtained as previously described.

length to diameter ratio of the extruder is 48. The K-Tron feeder feeds the polymer powder under a nitrogen purge into the extruder feed throat (barrel 1). The maleic anhydride/methyl ethyl ketone/Luperox 101 solution is formed by dissolving maleic anhydride in methyl ethyl ketone in a 1:1 ratio (by mass), weighing an aliquot of the maleic anhydride/methyl ethyl ketone solution and adding Luperox 101 peroxide. The amount of Luperox 101 peroxide added to the aliquot depends on the desired maleic anhydride/Luperox 101 ratio. The HPLC pump injects the maleic anhydride/methyl ethyl ketone/Luperox 101 solution between the 5$^{th}$ and 6$^{th}$ barrel sections. The vacuum system (containing 3 knock-out pots) is connected to a devolatilization port in barrel 11 to remove the non-reacted maleic anhydride and byproducts of the reaction. A nitrogen stream is continuously flowed into the vacuum system to prevent against hazardous conditions. Finally, the resulting MAH-grafted polypropylene (MAH-g-PP) is melt flowed through the extruder and the extrudate exiting the die is immediately quenched by a water bath. The polymer strands are subsequently pelletized by a pelletizer. The total feed rate is 6.8 Kg/hr and the maleic anhydride loading is 0.4 wt %. The loading of methyl ethyl ketone is 0.4 wt %. The maleic anhydride/Luperox 101 ratio is 10 and thus, the Luperox 101 loading is 0.04 wt %. The target MAH-grafting level is 0.2%. Table 3 shows the barrel temperature profile for twin-screw extruder in the reactive extrusion of maleic

TABLE 2

| Characterization of MAH-g-PE Control Polymer | | | | | | | | | |
|---|---|---|---|---|---|---|---|---|---|
| Run# | wt % MAH[a] (titration) | GE (%) | $M_w$[b] | $M_n$[b] | PDI[b] | I2[c] | I10[c] | Ratio I10/I2 | Peel strength (N/m)[d] |
| DOWLEX 2045G control processed at 180° C. | NA | NA | 103,590 | 26,585 | 3.90 | 0.22 | 5.29 | 24.0 | ND |
| Comparative Sample A (CS-A) | 0.26 ± 0.03 | 65 ± 9 | 98,435 | 21,315 | 4.62 | 0.13 | 3.14 | 24.1 | 657 ± 161 |

[a]Average of three measurements.
[b]High temperature GPC data is obtained on crude samples (one measurement).
[c]I2 and I10 data is obtained on crude samples using a Melt Flow Jr. instrument from CEAST, which follows the ASTM D 1238 method.
[d]Average of four measurements.
ND = not detected
GE = grafting efficiency = ((wt % MAH grafted)/(Equivalent wt % MAH added to the reaction))*100.

5. Control Sample—Preparation of MAH-g-PP

MAH is grafted onto polypropylene (PRO-FAX™ 6361) in a Krupp Werner & Pfleiderer twin-screw co-rotating extruder system (ZSK-25). The system contains an extruder with 12 barrel sections, 11 of which are independently controlled with electric heating and water cooling, a 25-mm twin-screw, a loss-in-weight feeder (K-Tron, model KCLQX3), a high-performance liquid chromatography (HPLC) pump (Alltech, model 627) to inject a maleic anhydride/methyl ethyl ketone/Luperox 101 solution, a vacuum system to remove any non-reacted MAH and byproducts, a water bath and a strand-cut pelletizer. The anhydride onto polypropylene. Table 4 shows the characterization results from the synthesized control MAH-grafted polypropylene (MAH-g-PP).

TABLE 3

| Barrel temperature profile for the twin-screw extruder in the reactive extrusion of maleic anhydride onto polypropylene. | |
|---|---|
| Barrel Zone | Temperature (° C.) |
| Zone #1 | 120 |
| Zone #2 | 210 |
| Zone #3 | 218 |
| Zone #4 | 231 |
| Zone #5 | 230 |

TABLE 3-continued

Barrel temperature profile for the twin-screw extruder in the reactive extrusion of maleic anhydride onto polypropylene.

| Barrel Zone | Temperature (° C.) |
|---|---|
| Zone #6 | 203 |
| Zone #7 | 229 |
| Zone #8 | 194 |
| Zone #9 | 180 |
| Zone #10 | 180 |
| Zone #11 | 160 |

A. MAH-g-PP—Grafting Levels of Maleic Anhydride (MAH) Determination

The grafting levels of MAH are determined via manual colorimetric titration. The MAH-g-PP sample (9.76 g) is purified via a precipitation of a hot toluene polymer solution (350 mL) into acetone (1 L). The MAH-grafted polymer is collected by filtration, washed with acetone (2×300 mL) and the polymer sample is dried in a vacuum oven at 80° C., overnight. Prior to the titration experiment, the purified polymer is dried in a nitrogen purged vacuum oven at 130° C. for one hour. Subsequently, 1 gram of the dried MAH-grafted polymer is dissolved in hot xylenes. The sample is titrated with 0.025 N tetrabutylammonium hydroxide in 50/50 methanol/toluene using bromothymol blue indicator to a constant blue color endpoint. The MAH-g-PP sample is titrated three times and the results are averaged.

TABLE 4

Characterization of MAH-g-PP Control Polymer

| Run# | wt % MAH (titration)[a] | GE (%) | $M_w^b$ | $M_n^b$ | $PDI^b$ | $I2^c$ | $I10^c$ | Ratio I10/I2 |
|---|---|---|---|---|---|---|---|---|
| PRO-FAX ™ 6301 | | | 254,710 | 37,930 | 6.74 | 7.47 | 137.0 | 18.3 |
| PRO-FAX ™ 6301 control processed in extruder at 230° C. | NA | NA | 202,590 | 33,260 | 6.09 | 10.71 | 185.4 | 17.3 |
| Comparative Sample B (CS-B) | 0.19 ± 0.03 | 48 ± 6 | 128,315 | 30,085 | 4.26 | 42.81 | 602.9 | 14.1 |

[a]Average of three measurements.
[b]High temperature GPC data is obtained on crude samples (average of two measurements).
[c]I2 and I10 data is obtained on crude samples using a Melt Flow Jr. instrument from CEAST, which follows the ASTM D 1238 method.
GE = grafting efficiency = ((wt % MAH grafted)/(Equivalent wt % MAH added to the reaction))*100.

6. Examples—Preparation of SPA-g-PE

Procedure for grafting reactions of 4-azidosulfonyl-phthalic anhydride onto polyethylene in pellet form performed in a Haake mixer: Polyethylene pellets (DOWLEX 2045G) are weighed into 125 mL wide mouth glass with a Teflon lined cap. The desired weight of mineral oil is added. The contents of the jar are sealed and placed within a secondary polyethylene jug, containing a pad with absorbent material. The blend contents are tumbled on a roller for 2 hours. After two hours, the desired amount of extra Irganox 1010 is added, followed by 4-azidosulfonylphthalic anhydride. The contents of the jar are sealed and placed within a secondary polyethylene jug, containing a pad with absorbent material. The blend contents are tumbled on a roller overnight to uniformly distribute the azide compound onto the polyethylene pellets. The next day, the grafting reaction is performed using a rebuilt Thermo Scientific Haake Polylab, Model 557-9301, with a Rheomix 600p, Model 557-1302, Hastelloy bowl and matching roller rotors/paddles installed and connected to a Gateway Windows 8 laptop computer. Control of the motor system is from a SEW Eurodrive MDX61B motor controller with MOVITOOLS—Motion-Studio, vers. 5.70, (5.7.0.2) software. An external box with Watlow EZ-zone units installed is used to set plate/bowl temperatures and high temperature limits. A Graphtec midi logger GL220 with GL220 820APS application software is used for data collection. The temperature at the Haake instrument is set to 200° C. and the system is allowed to equilibrate. The pre-mixed polyethylene pellets with 4-azidosulfonylphthalic anhydride are added to the Haake, and the mixture is fluxed for 5 min with rpm=80. The Haake instrument is subsequently stopped and the SPA-g-PE polymer is removed from the mixer while hot. Table 5 shows the material quantities used in the grafting experiments, and Table 7 shows the characterization results from the synthesized SPA-g-PE polymers.

A. SPA-g-PE—Grafting Levels of Maleic Anhydride (MAH) Determination

The grafting levels of MAH are determined via manual colorimetric titration. SPA-g-PE samples (10 g) are purified via precipitation of hot toluene polymer solutions (350 mL) into acetone (1 L). The SPA-g-PE polymers are collected by filtration, washed with acetone (2×300 mL) and the polymer samples are dried in a vacuum oven at 80° C., overnight. Prior to the titration experiments, the purified polymers are dried in a nitrogen purged vacuum oven at 130° C. for at least one hour. Subsequently, 1-2 grams of the dried SPA-g-PE polymer are dissolved in hot xylenes. The samples are titrated with 0.025 N tetrabutylammonium hydroxide in 50/50 methanol/toluene using bromothymol blue indicator to a constant blue color endpoint. Each SPA-g-PE sample is titrated three times and the results are averaged.

TABLE 5

Material quantities used in the grafting reactions of 4-azidosulfonylphthalic anhydride onto polyethylene in pellets performed in a Haake mixer

| Example # | DOWLEX 2045G (g) | Mineral oil (wt %, g) | Irganox 1010 (wt %, g) | 4-azidosulfonylphthalic anhydride (wt %, g) | Equivalent wt % MAH | Jar residue (g)[a] |
|---|---|---|---|---|---|---|
| DOWLEX 2045G control processed at 200° C. | 45.02 | NA | NA | NA | NA | — |
| Example 1 | 44.99 | 0.198, 0.089 | 0.0492, 0.0223 | 0.496, 0.225 | 0.192 | 0.027 |
| Example 2 | 45.00 | 0.406, 0.185 | 0.0493, 0.0225 | 0.985, 0.449 | 0.381 | 0.027 |
| Example 3 | 44.99 | 0.782, 0.362 | 0.0484, 0.0224 | 1.945, 0.900 | 0.752 | 0.066 |
| Example 4 | 45.00 | 1.153, 0.541 | 0.0480, 0.0225 | 2.877, 1.350 | 1.11 | 0.089 |

General grafting conditions: T = 200° C., rpm = 80, time = 5 min.
DOWLEX 2045G (pellet).
[a]Residue left in the jars after transferring the mixture of PE and sulfonyl azide anhydride molecule into the Haake instrument.

TABLE 6

Characterization of SPA-g-PE Polymers

| Run# | wt % MAH (titration)[a] | GE (%)[b] | $M_w$[c] | $M_n$[b] | PDI[c] | I2[d] | I10[d] | Ratio I10/I2 | Peel strength (N/m)[d] |
|---|---|---|---|---|---|---|---|---|---|
| DOWLEX 2045G control processed at 200° C. | NA | NA | 98,155 | 22,130 | 4.44 | 0.82 | 7.29 | 8.8 | 5.9 ± 3.3[e] |
| Example 1 | 0.15 ± 0.02 | 78 ± 10 | 109,070 | 26,190 | 4.16 | 0.69 | | | 538 ± 87[f] |
| Example 2 | 0.25 ± 0.02 | 65 ± 4 | 111,745 | 27,260 | 4.10 | 0.76 | 5.42 | 7.1 | 620 ± 65[f] |
| Example 3 | 0.41 ± 0.03 | 55 ± 3 | 111,520 | 26,475 | 4.21 | 0.54 | | | 624 ± 164[f] |
| Example 4 | 0.61 ± 0.01 | 55 ± 1 | 112,900 | 28,205 | 4.00 | 0.32 | 5.03 | 15.7 | 813 ± 94[g] |

[a]Average of three measurements.
[b]GE = grafting efficiency = ((wt % MAH grafted)/(Equivalent wt % MAH added to the reaction))*100.
[c]High temperature GPC data is obtained on crude samples (one measurement).
[d]I2 and I10 data is obtained on crude samples using a Melt Flow Jr. instrument from CEAST, which follows the ASTM D 1238 method (one measurement).
[e]Peel strength obtained on un-processed DOWLEX 2045G sample (average of three measurements).
[f]Average of three measurements.
[g]Average of two measurements.

7. Examples—Preparation of SPA-g-PP

The reactive extrusion of polypropylene (PRO-FAX™ 6361) with 4-azidosulfonylphthalic anhydride is conducted on a Coperion ZSK-25MC twin-screw extruder. The extruder is equipped with 25 twin-screw and 12 barrel segments for a total length to diameter ratio of 48. There are 11 independently controlled barrel sections with electric heating and water cooling. The temperature profile of extrusion is given in Table 8. A predetermined amount of polypropylene powder, 4-azidosulfonylphthalic anhydride and Irganox 1010 is weighed and mixed inside a fume hood to prepare a total of 4.5 Kg of mixture. The composition of the mixture is 99.45% of polypropylene, 0.5 wt % of 4-azidosulfonylphthalic anhydride and 0.05 wt % of Irganox 1010. The mixed powder is carefully transferred to a K-Tron Model KCL24KQX4 loss-in-weight feeder and fed to the extruder hopper under nitrogen purge in the first barrel section. The extruder screw speed is 500 rpm. Correspondingly, the die pressure is 672 psi (4.63 MPa) and the motor torque load is 48%. Finally, the polymer melt is pelletized using a GALA LPU underwater pelletization system. A two-hole die is used with 55° F. (~13° C.) water temperature and a cutter speed of 2300 rpm. Table 7 shows the barrel temperature profile for twin-screw extruder for the reactive extrusion of polypropylene with 4-azidosulfonylphthalic anhydride and Table 8 shows the characterization results from the synthesized SPA-grafted polypropylene (SPA-g-PP) polymer.

TABLE 7

Barrel temperature profile for twin-screw extruder for the reactive extrusion of polypropylene with 4-azidosulfonylphthalic anhydride.

| Barrel Zone | Temperature (° C.) |
|---|---|
| Zone #1 | 175 |
| Zone #2 | 240 |
| Zone #3 | 249 |
| Zone #4 | 246 |
| Zone #5 | 250 |
| Zone #6 | 250 |
| Zone #7 | 220 |
| Zone #8 | 200 |
| Zone #9 | 180 |
| Zone #10 | 170 |
| Zone #11 | 172 |

TABLE 8

Characterization of SPA-g-PP Polymers.

| Run# | wt % MAH (titration)[a] | GE (%)[b] | $M_w$[c] | $M_n$[c] | PDI[c] | I2[d] | I10[d] | Ratio I10/I2 |
|---|---|---|---|---|---|---|---|---|
| PRO-FAX ™ 6361 | | | 254,710 | 37,930 | 6.74 | 7.47 | 137.0 | 18.3 |
| PRO-FAX ™ 6361 processed in extruder at 230 ° C. | NA | NA | 202,590 | 33,260 | 6.09 | 10.71 | 185.4 | 17.3 |
| Example 5 | 0.19 ± 0.01 | 103 ± 4.5 | 173,010 | 32,630 | 5.33 | 12.4 | 207.7 | 16.7 |

[a]Average of three measurements.
[b]GE = grafting efficiency = ((wt % MAH grafted)/(Equivalent wt % MAH added to the reaction))*100.
[c]High temperature GPC data is obtained on crude samples (average of two measurements).
[d]I2 and I10 data is obtained on crude samples using a Melt Flow Jr. instrument from CEAST, which follows the ASTM D 1238 method.

8. Scale-Up 1: Preparations of SPA-g-PE

Scale up grafting reaction of 4-azidosulfonylphthalic anhydride onto polyethylene in pellet form (2.5 Kg) performed in a Leistritz 18 mm Reactive Extruder (Twin-Screw).

Polyethylene pellets (DOWLEX 2045G) are weighed into 2 separate 1 gallon wide mouth glass jars with Teflon lined caps. The desired weight of mineral oil is added. The jars are sealed and the contents are tumbled on a roller for 2 hours. Then, the desired amount of extra Irganox 1010 is added, followed by 4-azidosulfonylphthalic anhydride. The jars are sealed and the contents are tumbled on a roller overnight. The day before the scale up run, the reactive extruder is purged with DOWLEX 2045G resin for 8 hours (h) at the desired temperature profile: temp at Zone 1=65° C., Zone 2 temp=140° C., Zone 3 to Zone 8 (die) temp=210° C. with rpm=160 and the flow rate setting is adjusted to be 6 g/min. The additional use of a low flow of nitrogen cover gas as plumbed to the feed throat is utilized to minimize oxidation of the base resin. The next day, the extruder is further purged with DOWLEX 2045G for an additional 2 hours using the same extrusion conditions as described above. Subsequently, the pre-mixed polyethylene pellets with 4-azidosulfonylphthalic anhydride are loaded into the feed hopper of the K-Tron KCL24-KT20 solid feeder inside a fume hood. The feed hopper is connected to the control panel of the feeder, and the pre-mixed polyethylene pellets and 4-azidosulfonylphthalic anhydride are run through the extruder for 20 min. The extruder conditions utilized are: Temp at Zone 1=65° C., Zone 2 temp=140° C., Zone 3 to Zone 8 (die) temp=210° C. with rpm=160, the flow rate is adjusted to be 5.85 g/min, and a low flow of nitrogen cover gas as plumbed to the feed throat is used for the duration of the run to minimize oxidation of the base resin. After the reactive extruder is stabilized, the extrudate is collected continuously as a single strand that is directed to a conveyer belt. The conveyer belt is connected to an air cooling system with extra ventilation to cool the polymer strand. When all the testing material is extruded, the extruder is purged with pure DOWLEX 2045G resin for 30 min. The solid feeder is stopped and the extruder is run until polymer flow ceased issuing from the die. The extruder is powered down and allowed to cool. The synthesized SPA-g-PE polymer is subsequently pelletized using a Conair Jetro polymer strand cutter/pelletizer. Table 9 shows the material quantities used in the scale-up run, and Table 10 shows the characterization results from the synthesized SPA-g-PE polymer (sample that is collected at time=3.5 hours). Total amount of polymer collected ~2,480 g.

A. SPA-g-PE—Grafting Levels of Maleic Anhydride (MAH) Determination (Scale-Up 1)

Grafting Levels of Maleic Anhydride (MAH) Determination.

The grafting levels of maleic anhydride (MAH) are determined using an fourier transform infrared spectroscopy (FTIR) calibration curve that correlates the wt % MAH (as determined by titration) vs. the normalized height of the 1788 cm$^{-1}$ band (FIG. 1, Equation 1). The infrared method is developed exclusively for SPA-g-PE samples synthesized via sulfonyl azide chemistry, using 4-azidosulfonylphthalic anhydride as monomer. For FTIR measurements, 1.5 grams of SPA-g-PE polymer is purified via precipitation of a hot toluene solution (60 mL) into acetone (400 mL). The polymer is collected by filtration, washed with acetone (2×150 mL) and dried in a vacuum oven at 80° C., overnight. The purified SPA-g-PE is compression molded into a film using a Teflon coated aluminum foil at 200° C., 20,000 lbs (9071.8474 kg) for 30 seconds. Prior to molding the film, the purified polymer is dried in a nitrogen purged vacuum oven for 3 hours at 160° C. to convert the residual diacid, back to the anhydride. The FTIR transmission spectra of the compression molded film are taken immediately after pressing the film using a Perkin-Elmer Spectrum One spectrometer. The spectral range covered 4500-400 cm$^{-1}$ with a 4 cm$^{-1}$ resolution. For each spectrum, 4 scans are co-added. Four spectra are acquired from different locations on the film and the results are averaged.

Perkin-Elmer Spectrum One Spectrometer Conditions:

| | |
|---|---|
| Number of scans: | 4 |
| Resolution: | 4 |
| Spectral ranged: | 4500-400 cm$^{-1}$ |
| Phase correction: | Automated baseline correction |
| Final format background: | Single beam |
| Final format sample: | Absorbance |
| Anhydride carbonyl band: | 1788 cm$^{-1}$ (peak height) |
| Anhydride carbonyl baseline: | 2100-660 cm$^{-1}$ |
| Normalization band: | 2751 cm$^{-1}$ (peak height) |
| Normalization baseline: | 3517-2446 cm$^{-1}$. |

The equation for determining wt % MAH via FTIR is provided in Equation 1 below.

Equation 1. Equation to Determine the Wt % MAH Via FTIR.

$$\text{wt \% } MAH = 0.3426 \times \left( \frac{\text{Corrected peak height@1788 cm}^{-1}}{\text{Corrected peak height@2751 cm}^{-1}} \right) + 0.0446$$

FIG. 1 shows the infrared calibration curve for wt % MAH.

TABLE 9

Material quantities used in the scale up grafting reaction of 4-azidosulfonylphthalic anhydride onto polyethylene performed in a Leistritz 18 mm Reactive Extruder (Twin Screw).

| Run# | DOWLEX 2045G (g) | Mineral oil (wt %, g) | Irganox 1010 (wt %, g) | 4-azidosulfonylphthalic anhydride (wt %, g) | Equivalent wt % MAH | Jar residue (g)$^a$ |
|---|---|---|---|---|---|---|
| DOWLEX 20456 (control) | Extruded sample from extruder purge | NA | NA | NA | NA | NA |
| Example 7-jar 1 | 1,300 | 0.394, 5.2 | 0.049, 0.650 | 0.936, 12.35 | 0.362 | 0.5 |
| Example 7-jar 2 | 1,300 | 0.394, 5.2 | 0.049, 0.649 | 0.936, 12.35 | 0.362 | 0.1 |

Temperature profile: Zone 1 temp = 65° C., Zone 2 temp = 140° C., Zone 3 to Zone 8 (die) temp = 210° C. rpm = 160. DOWLEX 20456 (pellet). Flow rate = 5.85 g/min.
$^a$Residue left in the jars after transferring the mixture of PE and sulfonyl azide anhydride molecule to the solid feeder.

TABLE 10

Characterization of SPA-g-PE Polymer

| Run# | wt % MAH (FTIR)$^a$ | GE (%)$^b$ | $M_w{}^c$ | $M_n{}^c$ | PDI$^c$ | I2$^d$ |
|---|---|---|---|---|---|---|
| DOWLEX 2045G (control) processed at 210° C. | NA | NA | 120,585 | 28,700 | 4.20 | 1.01 |
| Example 7 (combined examples from jars 1 and 2, collected at time = 3.5 h) | 0.23 ± 0.03 | 66 ± 9 | 117,565 | 30,915 | 3.80 | 0.75 |

$^a$Average of four measurements.
$^b$GE = grafting efficiency = ((wt % MAH grafted)/(Equivalent wt % MAH added to the reaction))*100.
$^c$High temperature GPC data is obtained on crude samples (one measurement).
$^d$I2 data is obtained on crude samples using a Melt Flow Jr. instrument from CEAST, which follows the ASTM D 1238 method.

9. Multilayer Film 1

A 2.5 kg sample of SPA-g-PE synthesized using DOWLEX 2045G as the base resin and 4-azidosulfonylphthalic anhydride (Example 7) is used as a tie layer in a 5 layer blown film trial. The film samples are produced on a LabTech 5-Layer blown film line using standard operating conditions. The 5 layers are represented as A/B/C/D/E with the "A" layer being in the inside of the bubble. The individual feed lines vary by position on the bubble. Layers "A" and "E" (outside layers) are fed from a 25 mm single flight screw, which contains no mixing elements. Layers "B", "C", and "D" (three inner layers) are fed from a 20 mm single flight screw, which contains no mixing elements. The 5 extruders combined produce a feed to the 75 mm 5-layer flat die (30/11/18/11/30) of 23 kg/hr. The blow up ratio is 2.5. The barrel temperatures range from 166° C. to 232° C. The standard frost line height is 30 cm.

Two film samples are prepared and the layer compositions are outlined in Table 11.

10. Scale-Up 2

Scale up grafting reaction of 4-azidosulfonylphthalic anhydride onto polyethylene in granular form (2.5 Kg) performed in a Leistritz 18 mm Reactive Extruder (Twin-Screw).

Polyethylene in the granular form (DJM-1810H ethylene/1-hexene copolymer) is weighed into 2 separate 1 gallon wide mouth glass jars with Teflon lined caps and into a ½ gallon wide mouth glass jar with Saran seal lid. The desired amount of 4-azidosulfonylphthalic anhydride is weighed into three separate 20 mL glass vials inside a fume hood. Into two separate 8 ounce (oz) glass jars with wide mouth and Teflon lined lids and a 4 oz glass jar with wide mouth and Teflon lined lid is added the desired amounts of Irganox 1010 and subsequently, the 4-azidosulfonylphthalic anhydride compound is transferred from the vials into the two separate 8 oz and 4 oz glass jars inside a fume hood. Subsequently, to the 8 oz and 4 oz jars is added the desired amounts of dichloromethane to dissolve the azide compound and Irganox 1010. Some cloudiness is noticed, meaning that

TABLE 11

| | | Blown Film Composition | |
|---|---|---|---|
| Layer | Layer weight % | Run #1 (control) | Run #2 (Example 8) |
| A | 30 | DOWLEX 2045G | DOWLEX 2045G |
| B | 10 | AMPLIFY TY 1451 | SPA-g-PE* |
| C | 20 | Nylon | Nylon |
| D | 10 | AMPLIFY TY 1451 | SPA-g-PE* |
| E | 30 | DOWLEX 2045G | DOWLEX 2045G |
| Comments | Total film thickness = 100 microns (4.0 mil) | Established run parameters using commercial tie layer | Replaced AMPLIFY TY 1451 with SPA-g-PE of Example 7 in layers B & D with no adjustments made to rate or temperature |
| Peel Strength | N/m | 1103 N/m | 1068 N/m |

*SPA-g-PE of Example 7.

A. Adhesion Strength—Multilayer Films

The prepared film samples are collected and evaluated for peel strength without any further heat treatment. Adhesion test strips prepared by the following procedure.

Figure 2:
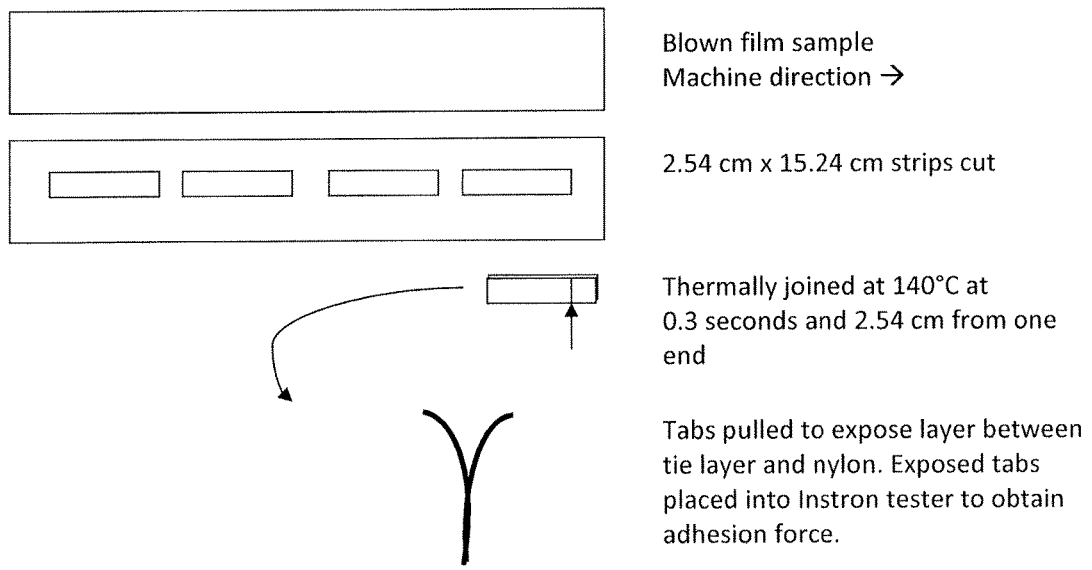
FIG. 2 is a schematic representation of an adhesion force test in accordance with an embodiment of the present disclosure.

Test strips are prepared from the 5 layer blown film, which is cut using a 2.54 cm×15.24 cm punch die in machine direction. Two strips are placed between a thermal sealer with jaws set to 140° C. and the strips are exposed to force for approximately 0.3 seconds approximately 2.54 cm from one end. This action effectively seals the two strips together at the point of impact from the jaws. The tabs are pulled apart by hand and this forced a separation at the interface between the nylon and the tie layer. The freshly separated parts are then placed into the jaws of an Instron and pulled apart at a rate of 5.08 cm/min. After an initial spike, the peel strength is measured from the plateau in force. The data reported in Table 11 is the average of 5 independent samples. A schematic representation of the peel strength test is shown in FIG. 2.

some compound may have not dissolved completely. The 4-azidosulfonylphthalic anhydride/Irganox 1010 solutions are added to the corresponding 1 gallon glass jars and ½ gallon glass jar containing the granular polyethylene. The 8 oz and 4 oz glass jars are rinsed with extra dichloromethane and the solutions are added to the 1 and ½ gallon glass jars (this is done to ensure the entire azide/Irganox 1010 compounds are transferred to the 1 and ½ gallon glass jars). Subsequently, the 1 and ½ gallon glass jars are sealed; shaken and the contents are tumbled on a roller overnight to uniformly swell the azide/Irganox 1010 dichloromethane solution into the granular polyethylene. The next day, the jar containing the azide/Irganox 1010 coated granular polyethylene is transferred to a heated vacuum oven set to 40° C. to remove the dichloromethane solvent overnight. The reactive extruder is purged the day before the run for 2 hours and the day of the run for 1 hour with granular polyethylene (DJM-1810H, gas-phase resin at the desired temperature profile: temp at Zone 1=120° C., temp at Zone 2=190° C., temp at Zone 3 to Zone 8 (die)=220° C. with rpm=200 and the flow rate setting is adjusted to be 0.38 Kg/h to obtain a residence time of approximately 4.10 min. The additional use of a low flow of nitrogen cover gas as plumbed to the feed throat is utilized to minimize oxidation of the base resin. Subsequently, the pre-mixed granular polyethylene with 4-azidosulfonylphthalic anhydride and Irganox 1010 are loaded into the feed hopper of the K-Tron KCL24-KT20 solid feeder inside a fume hood. The feed hopper is subsequently connected to the control panel of the solid feeder, and the pre-mixed granular polyethylene and 4-azidosulfonylphthalic anhydride are run through the extruder for 15 min before polymer collection started. After the reactive extruder is stabilized, the extrudate is collected continuously as a single strand that is directed to a conveyer belt. The conveyer belt is connected to an air cooling system with extra ventilation to cool the polymer strand. When all the testing material is extruded, the extruder is purged with plain DJM-1810H, polyethylene resin. The solid feeder is stopped and the extruder is run until polymer flow ceased issuing from the die. The extruder is powered down and allowed to cool. The synthesized SPA-g-PE polymer is subsequently pelletized using a Conair Jetro polymer strand cutter/pelletizer. Table 12 shows the material quantities used in the scale-up run, and Table 13 shows the characterization results from the synthesized SPA-g-PE polymer (sample that is collected at time=3.5 hours (h)). Total amount of polymer collected ~2,492 g.

A. Grafting Levels of Maleic Anhydride (MAH) Determination

The grafting levels of MAH are determined via manual colorimetric titration. The SPA-g-PE sample (10 g) is purified via precipitation of a hot toluene polymer solution (350 mL) into acetone (1 L). The SPA-g-PE polymer is collected by filtration, washed with acetone (2×300 mL) and the polymer sample is dried in a vacuum oven at 80° C., overnight. Prior to the titration experiment, the purified polymer is dried in a nitrogen purged vacuum oven at 130° C. for at least one hour. Subsequently, 1 gram of the dried SPA-g-PE polymer is dissolved in hot xylenes. The sample is titrated with 0.020 N tetrabutylammonium hydroxide in 50/50 methanol/toluene using bromothymol blue indicator to a constant blue color endpoint. The SPA-g-PE sample is titrated three times and the results are averaged.

TABLE 12

Material quantities used in the scale up grafting reaction of 4-azidosulfonylphthalic anhydride onto polyethylene in granular form performed in a Leistritz 18 mm Reactive Extruder (Twin-Screw)

| Run# | DJM-1810H (g) | Irganox 1010 (wt %, g) | 4-azidosulfonylphthalic anhydride (wt %, g) | Equivalent wt % MAH | Total Dichloromethane (mL) | Jar residue (g)$^a$ |
|---|---|---|---|---|---|---|
| gas-phase resin (control) | Extruded sample from instrument purge | NA | NA | NA | NA | NA |
| Example 9 (Jar #1) 1 gallon | 1050 | 0.0497, 0.525 | 0.493, 5.205 | 0.191 | 125 | 0.47 |
| Example 9 (Jar #2) 1 gallon | 1050 | 0.0497, 0.525 | 0.495, 5.226 | 0.191 | 125 | 0.52 |
| Example 9 (Jar #3) ½ gallon | 500 | 0.0498, 0.25 | 0.501, 2.519 | 0.193 | 60 | 0.32 |

Temperature profile: Zone 1 temp = 120° C., Zone 2 temp = 190° C., Zone 3 to Zone 8 (die) temp = 220° C. rpm = 200. DJM-1810H gas-phase PE resin (granular). Flow rate = 0.38 Kg/h.
$^a$Residue left in the jars after transferring the mixture of PE and sulfonyl azide anhydride molecule to the solid feeder.

TABLE 13

Characterization of SPA-g-PE Polymer

| Run# | wt % MAH (titration)$^a$ | GE (%)$^b$ | Mw$^c$ | Mn$^c$ | PDI$^c$ | I2$^d$ |
|---|---|---|---|---|---|---|
| Gas-phase PE resin (control) processed at 220° C. | NA | NA | 100,390 | 27,990 | 3.59 | 0.76 |
| Example 9 (combined examples from Example 9 Jars #1-3, collected at time = 3.5 h) | 0.17 ± 0.01 | 89 ± 5 | 132,290 | 31,090 | 4.25 | 0.64 |

$^a$Average of three measurements.
$^b$GE = grafting efficiency = ((wt % MAH grafted)/(Equivalent wt % MAH added to the reaction))*100.
$^c$High temperature GPC data is obtained on crude samples (one measurement).
$^d$I2 data is obtained on crude samples using a Melt Flow Jr. instrument from CEAST, which follows the ASTM D 1238 method.

Note: the material quantities specified in Table 12 were combined and run in the extruder to prepare SPA-g-PE, (scale-up #2 or Example 9). A sample is collected at time=3.5 hours for testing shown in Table 13.

11. Multilayer Film 2

Four film samples are prepared using the SPA-g-PE from Example #9 and the layer compositions are outlined in Table 14.

TABLE 14

Blown Film Composition

| Layer | Layer weight % | Run #1 (control) | Example 10 | Run #3 (control) | Example 11 |
|---|---|---|---|---|---|
| A | 30 | DOWLEX 2045G | DOWLEX 2045G | DOWLEX 2045G | DOWLEX 2045G |
| B | 10 | AMPLIFY TY 1353 | SPA-g-PE* | AMPLIFY TY 1353 | SPA-g-PE* |
| C | 20 | Nylon | Nylon | EVOH copolymer | EVOH copolymer |
| D | 10 | AMPLIFY TY 1353 | SPA-g-PE* | AMPLIFY TY 1353 | SPA-g-PE* |
| E | 30 | DOWLEX 2045G | DOWLEX 2045G | DOWLEX 2045G | DOWLEX 2045G |
| Comments | | Total film thickness = 50 micron (2.0 mil) | Established run parameters using commercial tie layer | Replaced AMPLIFY TY 1353 with SPA-g-PE in layers B &D with no adjustments made to rate or temperature | Established run parameters using commercial tie layer | Replaced AMPLIFY TY 1353 with SPA-g-PE in layers B & D with no adjustments made to rate or temperature |
| Peel Strength (average of five readings) | N/m | 593 | 627 | 588 | 677 |

*SPA-g-PE of Example 9.

The prepared film samples are collected and evaluated for adhesion strength without any further heat treatment. Adhesion test strips prepared by the following procedure.

Test strips are prepared from the 5 layer blown film which is cut using a 2.54 cm×15.24 cm punch die in machine direction. Two strips are placed between a thermal sealer with jaws set to 140° C. and the strips are exposed to force for approximately 0.3 seconds approximately 2.54 cm from one end. This action effectively seals the two strips together at the point of impact from the jaws. The tabs are pulled apart by hand and this forces a separation at the interface between the nylon and the tie layer. The freshly separated parts are then placed into the jaws of an Instron and pulled apart at a rate of 5.08 cm/min. For 5 independent samples, the average force needed to initiate delamination is recorded in Table 14. The force needed to induce delamination is for the azide samples are similar to the comparative.

The optical properties are also evaluated for the films. The data is shown Table 15 (nylon film of Example 10) and Table 16 (EVOH film of Example 11) below.

TABLE 15

Nylon Film (Example 10)

|  | SPA-g-PE | Control |
|---|---|---|
| Transmittance (%)* | 99.5 | 99.4 |
| Haze (%)* | 13.2 | 13.7 |
| Clarity (%) Zebedee* | 70.1 | 67.2 |

*Average of five readings.

TABLE 16

EVOH Film (Example 11)

|  | SPA-g-PE | Control |
|---|---|---|
| Transmittance (%)* | 99.0 | 99.0 |
| Haze (%)* | 16.9 | 18.0 |
| Clarity (%) Zebedee* | 58.4 | 59.7 |

*Average of five readings.

TABLE 17

Optical Properties - Test Methods

| Haze | Optical Property | Film | ASTM D1003 |
|---|---|---|---|
| Clarity - Zebedee - Film Only | Optical Property | Film | ASTM D1746 |
| Transmittance | Optical Property | Film | ASTM D1003 |

Applicant surprisingly discovered a multi-layer film is produced where interlayer adhesion using SPA-g-PE as the tie layer has the same or better adhesion properties as conventional MAH-g-PE prepared by a free radical process. The present SPA-g-PE tie layer experiences little, or no chain scission, and little, or no, undesired crosslinking. Additionally, multilayer film produced with the present SPA-g-PE exhibits optical properties such as haze, clarity, and transmittance equal to, or better than, multilayer film made with conventional MAH-g-PE prepared by a free radical process. These results confirm that sulfonamide derivative-graft-polyolefin (and SPA-g-PE in particular) is an effective tie layer that advantageously avoids the negative processing effects of free radical MAH-grafted-polyolefin.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A multilayer film comprising:
   a layer (A) comprising an olefin-based polymer;
   a layer (B) that is a tie layer comprising a sulfonamide derivative grafted olefin-based polymer (SD-g-PO) having the Structure (2)

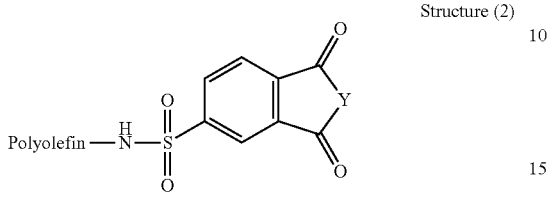

Structure (2)

wherein the nitrogen, N, is bound to a carbon, C, of the polyolefin;
   Y is selected from the group consisting of O, S, PH, PR, NH, and NR; and
   R is selected from the group consisting of an alkyl group and an aryl group; and
   a layer (C) comprising a polar component.

2. The multilayer film of claim 1 wherein the sulfonamide derivative is sulfonamide phthalic anhydride (SPA) and the SPA-g-PO has the Structure (4) below

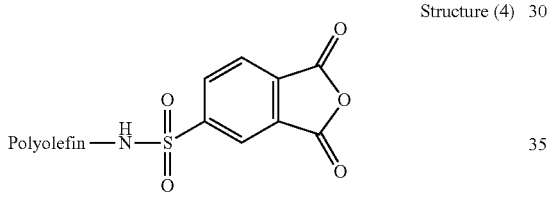

Structure (4)

wherein the nitrogen, N, is bound to a carbon, C, of the polyolefin.

3. The multilayer film of claim 1 wherein the SD-g-PO forms at least one linkage with the polar component of the layer (C), the linkage having the Structure (5)

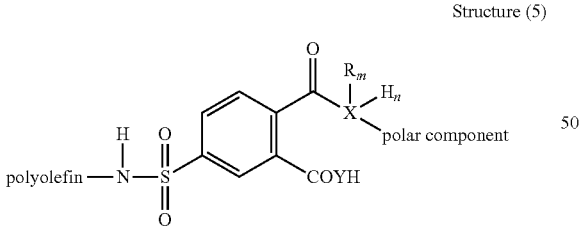

Structure (5)

wherein the nitrogen, N, is bound to a carbon, C, of the polyolefin;
   X is selected from group consisting of O, S, P, and N;
   Y is selected from O, PH, S, and NH;
   R is a $C_1$-$C_8$ alkyl group; and
   m and n each independently is 0 or 1 with the proviso when m=1, n=0 and when n=1, m=0.

4. The multilayer film of claim 3 wherein Y is 0.

5. The multilayer film of claim 4 wherein the layer (A) comprises an ethylene/alpha-olefin copolymer;
   the layer (B) comprises sulfonamide phthalic anhydride (SPA) grafted ethylene-based polymer (SPA-g-PE);
   the layer (C) comprises a nylon; and
   the multilayer film has a peel strength from 538 N/m to 813 N/m as measured in accordance with the T-Peel test.

6. A multilayer film comprising:
   a layer (A) comprising an olefin-based polymer;
   a layer (B) that is a tie layer comprising a sulfonamide derivative grafted olefin-based polymer (SD-g-PO);
   a layer (C) comprising a polar component;
   a layer (D) that is a tie layer, the layer (D) comprising the SD-g-PO;
   a layer (E) comprising an olefin-based polymer;
   the multilayer film has the structure A/B/C/D/E; and
   the SD-g-PO in layer (B) and the SD-g-PO in layer (D) each form at least one linkage with the polar component of the layer (C), the linkages having the Structure (5)

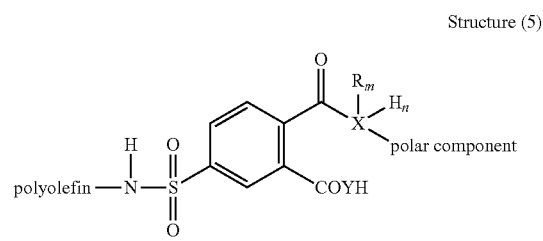

Structure (5)

wherein the nitrogen, N, is bound to a carbon, C, of the polyolefin;
   X is selected from group consisting of O, S, P, and N;
   Y is selected from O, S, PH, and NH;
   R is a $C_1$-$C_8$ alkyl group; and
   m and n each independently is 0 or 1 with the proviso when m=1, n=0 and when n=1, m=0.

7. The multilayer film of claim 6 wherein
   the layer (A) comprises an ethylene/alpha-olefin copolymer;
   the layer (B) comprises sulfonamide phthalic anhydride grafted ethylene-based polymer (SPA-g-PE);
   the layer (C) comprises a nylon or an ethylene/vinyl alcohol (EVOH) copolymer;
   the layer (D) comprises sulfonamide phthalic anhydride grafted ethylene-based polymer (SPA-g-PE); and
   the layer (E) comprises an ethylene/alpha-olefin copolymer.

8. The multilayer film of claim 7 wherein the film is a blown film and the blown film has a peel strength from 500 N/m to 1100 N/m.

9. A process comprising:
   melt blending (i) polyolefin that is an ethylene/1-octene copolymer (PE) having a first melt flow (MF1) and (ii) a sulfonyl azide derivative at a temperature greater than or equal to the decomposition temperature of the sulfonyl azide derivative;
   grafting the sulfonyl azide derivative to the polyolefin substrate with at least 50% grafting efficiency; and
   producing a sulfonamide derivative grafted polyolefin (SD-g-PO) comprising from 0.15 wt % to 0.61 wt % maleic anhydride (MAH), the SD-g-PE having a second melt flow (MF2), wherein MF1-MF2 is from 0.06 g/10 min to 0.50 g/10 min as measured in accordance with ASTM D 1238 (190° C./2.16 kg).

10. The process of claim 9 wherein the sulfonyl azide derivative has the Structure (1) and the melt blending converts the sulfonyl azide to a sulfonyl nitrene and eliminates nitrogen gas;

inserting the sulfonyl nitrene into a carbon hydrogen bond of the polyolefin;

forming a sulfonamide derivative grafted polyolefin having the Structure (2) according to the reaction Scheme 1 below

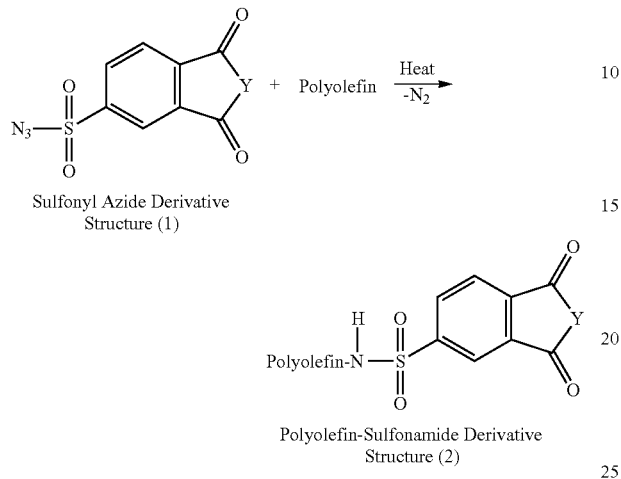

wherein Y is selected from the group consisting of O, S, PH, PR, NH, and NR;

R is selected from the group consisting of an alkyl group and an aryl group; and the nitrogen, N, in Structure (2) is bound to a carbon, C, of the polyolefin.

* * * * *